US011938618B2

(12) United States Patent
Yap et al.

(10) Patent No.: US 11,938,618 B2
(45) Date of Patent: Mar. 26, 2024

(54) SYSTEMS AND METHODS FOR OBJECT PROCESSING USING A PASSIVELY FOLDING VACUUM GRIPPER

(71) Applicant: Berkshire Grey Operating Company, Inc., Bedford, MA (US)

(72) Inventors: Jason Yap, Newton, MA (US); Aidan Rose, Waban, MA (US); Gabriel Nelson, Wilmington, DE (US); Matthew T. Mason, Pittsburgh, PA (US); Christopher Geyer, Arlington, MA (US)

(73) Assignee: Berkshire Grey Operating Company, Inc., Bedford, MA (US)

( * ) Notice: Subject to any disclaimer, the term of this patent is extended or adjusted under 35 U.S.C. 154(b) by 92 days.

(21) Appl. No.: 17/375,758

(22) Filed: Jul. 14, 2021

(65) Prior Publication Data

US 2022/0024056 A1    Jan. 27, 2022

Related U.S. Application Data

(60) Provisional application No. 63/054,856, filed on Jul. 22, 2020.

(51) Int. Cl.
*B25J 15/06* (2006.01)
*B25J 15/00* (2006.01)
*B25J 9/00* (2006.01)

(52) U.S. Cl.
CPC ....... *B25J 15/0683* (2013.01); *B25J 15/0028* (2013.01); *B25J 9/0093* (2013.01)

(58) Field of Classification Search
CPC . B25J 15/0028; B25J 15/0683; B66C 1/0206; B66C 1/0231
See application file for complete search history.

(56) References Cited

U.S. PATENT DOCUMENTS

| 2,702,038 A | 1/1954 | Uddenberg et al. |
| 2,853,333 A | 9/1955 | Littell |
| 2,916,059 A | 12/1959 | Wong |

(Continued)

FOREIGN PATENT DOCUMENTS

| CN | 1411420 A | 4/2003 |
| CN | 101282824 A | 10/2008 |

(Continued)

OTHER PUBLICATIONS

Notification Concerning Transmittal of Copy of International Preliminary Report on Patentability and the International Preliminary Report on Patentability issued by the International Bureau of WIPO in International Application No. PCT/US2021/041846 dated Feb. 2, 2023, 9 pages.

(Continued)

*Primary Examiner* — Dean J Kramer
(74) *Attorney, Agent, or Firm* — Gesmer Updegrove LLP

(57) ABSTRACT

An end-effector for a programmable motion device is disclosed. The end effector includes a body that includes a contact portion, the body providing an open interior through which a vacuum may be provided to the contact portion, and the body including at least one feature that is adapted to facilitate the contact portion to become substantially non-planar while grasping.

37 Claims, 23 Drawing Sheets

(56) References Cited

U.S. PATENT DOCUMENTS

| | | | |
|---|---|---|---|
| 3,005,652 A * | 10/1961 | Helm | B66C 1/0212 |
| | | | 294/189 |
| 3,195,941 A | 7/1965 | Morey | |
| 3,637,249 A | 1/1972 | Kuhl et al. | |
| 3,651,957 A | 3/1972 | Ball et al. | |
| 3,656,794 A | 4/1972 | McCord | |
| 3,720,433 A * | 3/1973 | Rosfelder | B66C 1/0243 |
| | | | 294/188 |
| 3,743,340 A | 7/1973 | Williamann | |
| 3,901,502 A | 8/1975 | Vits | |
| 4,243,040 A | 1/1981 | Beecher | |
| 4,340,249 A | 7/1982 | Bucklew | |
| 4,381,601 A | 5/1983 | Tamai et al. | |
| 4,389,064 A | 6/1983 | Laverriere | |
| 4,412,775 A | 11/1983 | Molitor et al. | |
| 4,469,100 A | 9/1984 | Hardwick | |
| 4,473,247 A | 9/1984 | Itemadani et al. | |
| 4,505,505 A | 3/1985 | Senaratne | |
| 4,557,659 A | 12/1985 | Scaglia | |
| 4,561,686 A | 12/1985 | Atchley | |
| 4,578,013 A | 3/1986 | Barillec et al. | |
| 4,653,793 A | 3/1987 | Guinot et al. | |
| 4,677,778 A | 7/1987 | Sorimachi et al. | |
| 4,681,063 A | 7/1987 | Hebrank | |
| 4,729,713 A | 3/1988 | Takaichi et al. | |
| 4,828,304 A | 5/1989 | No et al. | |
| 4,850,627 A | 7/1989 | Franklin | |
| 4,858,974 A | 8/1989 | Stannek | |
| 4,917,427 A | 4/1990 | Scaglia | |
| 5,024,575 A | 6/1991 | Anderson | |
| 5,127,692 A | 7/1992 | Yakou et al. | |
| 5,190,332 A * | 3/1993 | Nagai | B65G 47/91 |
| | | | 271/90 |
| 5,192,070 A | 3/1993 | Nagai et al. | |
| 5,207,465 A | 5/1993 | Rich | |
| 5,226,757 A | 7/1993 | Tarrant | |
| 5,263,753 A * | 11/1993 | Breu | B65G 47/90 |
| | | | 294/196 |
| 5,344,202 A | 9/1994 | Ramler et al. | |
| 5,542,726 A | 8/1996 | Ozawa | |
| 5,564,893 A | 10/1996 | Tacchi et al. | |
| 5,752,729 A | 5/1998 | Crozier et al. | |
| 5,764,013 A | 6/1998 | Yae | |
| 5,777,267 A | 7/1998 | Szydel | |
| 5,865,487 A | 2/1999 | Gore et al. | |
| 5,865,827 A * | 2/1999 | Bullister | A61B 17/442 |
| | | | 606/1 |
| 5,882,055 A | 3/1999 | Smith | |
| 6,015,174 A | 1/2000 | Raes et al. | |
| 6,167,607 B1 | 1/2001 | Pryor | |
| 6,193,291 B1 | 2/2001 | Morroney | |
| 6,244,640 B1 | 6/2001 | Le Bricquer et al. | |
| 6,517,130 B1 | 2/2003 | Donoso et al. | |
| 6,721,444 B1 | 4/2004 | Gu et al. | |
| 6,817,639 B2 | 11/2004 | Schmalz et al. | |
| 6,846,029 B1 | 1/2005 | Ragner et al. | |
| 6,994,387 B1 | 2/2006 | Ragner et al. | |
| 7,000,964 B1 | 2/2006 | Porras et al. | |
| 7,004,524 B2 | 2/2006 | Marshall | |
| 7,017,961 B1 | 3/2006 | Parnell et al. | |
| 7,140,389 B2 | 11/2006 | Schnatterer et al. | |
| 7,263,890 B2 | 9/2007 | Takahashi | |
| 7,311,489 B2 | 12/2007 | Ekman | |
| 7,313,464 B1 | 12/2007 | Perreault et al. | |
| 7,474,939 B2 | 1/2009 | Oda et al. | |
| 7,481,472 B2 | 1/2009 | Cawley et al. | |
| 7,618,074 B2 | 11/2009 | Zimmer | |
| 7,677,622 B2 | 3/2010 | Dunkmann et al. | |
| 7,785,422 B2 | 8/2010 | Autumn et al. | |
| 8,070,203 B2 | 12/2011 | Schaumberger | |
| 8,096,598 B2 | 1/2012 | Perlman | |
| 8,132,835 B2 | 3/2012 | Ban et al. | |
| 8,162,362 B2 | 4/2012 | Braunschweiger et al. | |
| 8,251,415 B2 | 8/2012 | Lomerson, Jr. | |
| 8,267,386 B2 | 9/2012 | Schaaf et al. | |
| 8,414,042 B2 | 4/2013 | Landes et al. | |
| 8,548,626 B2 | 10/2013 | Steltz et al. | |
| 8,560,121 B2 | 10/2013 | Hjørnet | |
| 8,777,284 B2 | 7/2014 | Schaller et al. | |
| 8,874,270 B2 | 10/2014 | Ando | |
| 8,960,751 B2 | 2/2015 | Regan et al. | |
| 9,061,868 B1 | 6/2015 | Paulsen et al. | |
| 9,120,622 B1 | 9/2015 | Elazary et al. | |
| 9,227,323 B1 | 1/2016 | Konolige et al. | |
| 9,259,844 B2 | 2/2016 | Xu et al. | |
| 9,266,237 B2 | 2/2016 | Nomura | |
| 9,283,680 B2 | 3/2016 | Yasuda et al. | |
| 9,457,477 B1 * | 10/2016 | Rublee | B25J 15/0023 |
| 9,486,926 B2 | 11/2016 | Kawano | |
| 9,492,923 B2 | 11/2016 | Wellman et al. | |
| 9,604,363 B2 | 3/2017 | Ban | |
| 9,623,570 B1 | 4/2017 | Krahn et al. | |
| 9,656,813 B2 | 5/2017 | Dunkmann et al. | |
| 9,981,379 B1 | 5/2018 | Youmans et al. | |
| 9,999,977 B2 | 6/2018 | Wagner et al. | |
| 10,011,020 B2 | 7/2018 | Wagner et al. | |
| 10,086,519 B2 | 10/2018 | Wagner et al. | |
| 10,118,300 B2 | 11/2018 | Wagner et al. | |
| 10,315,315 B2 | 6/2019 | Wagner et al. | |
| 10,335,956 B2 | 7/2019 | Wagner et al. | |
| 10,357,883 B1 * | 7/2019 | O'Connor | B25J 15/0616 |
| 10,668,630 B2 | 6/2020 | Robinson et al. | |
| 10,850,402 B2 | 12/2020 | Wagner et al. | |
| 11,426,882 B2 | 8/2022 | Takahashi et al. | |
| 2001/0045755 A1 | 11/2001 | Schick et al. | |
| 2003/0038491 A1 | 2/2003 | Schmalz et al. | |
| 2003/0160470 A1 | 8/2003 | Marshall | |
| 2003/0164620 A1 | 9/2003 | Schmalz et al. | |
| 2004/0169386 A1 | 9/2004 | Shuttleworth | |
| 2004/0232716 A1 | 11/2004 | Reed et al. | |
| 2006/0242785 A1 | 11/2006 | Cawley et al. | |
| 2006/0267360 A1 | 11/2006 | Kiaie et al. | |
| 2008/0179224 A1 | 7/2008 | Van Bossuyt | |
| 2009/0019818 A1 | 1/2009 | Gilmore et al. | |
| 2010/0040450 A1 | 2/2010 | Parnell | |
| 2010/0078953 A1 | 4/2010 | Ban et al. | |
| 2010/0079853 A1 | 4/2010 | Rakich et al. | |
| 2010/0103960 A1 | 4/2010 | Kasamatsu et al. | |
| 2010/0175487 A1 | 7/2010 | Sato | |
| 2010/0180711 A1 | 7/2010 | Kilibarda et al. | |
| 2010/0241260 A1 | 9/2010 | Kilibarda et al. | |
| 2011/0126681 A1 | 6/2011 | Blanchet et al. | |
| 2012/0319416 A1 | 12/2012 | Ellis et al. | |
| 2013/0110280 A1 | 5/2013 | Folk | |
| 2013/0129464 A1 | 5/2013 | Regan et al. | |
| 2013/0232918 A1 | 9/2013 | Lomerson, Jr. | |
| 2013/0277999 A1 | 10/2013 | Schaller et al. | |
| 2014/0005831 A1 | 1/2014 | Naderer et al. | |
| 2014/0067121 A1 | 3/2014 | Brooks et al. | |
| 2014/0067127 A1 | 3/2014 | Gotou | |
| 2014/0105719 A1 | 4/2014 | Mueller et al. | |
| 2014/0260678 A1 | 9/2014 | Jentoft et al. | |
| 2015/0032252 A1 | 1/2015 | Galluzzo | |
| 2015/0073589 A1 | 3/2015 | Khodl et al. | |
| 2015/0081090 A1 | 3/2015 | Dong | |
| 2015/0298316 A1 | 10/2015 | Accou et al. | |
| 2015/0306770 A1 | 10/2015 | Mittal et al. | |
| 2015/0328779 A1 | 11/2015 | Bowman et al. | |
| 2015/0375401 A1 | 12/2015 | Dunkmann et al. | |
| 2016/0136816 A1 | 5/2016 | Pistorino | |
| 2016/0167227 A1 | 6/2016 | Wellman et al. | |
| 2016/0221187 A1 | 8/2016 | Bradski et al. | |
| 2016/0243704 A1 | 8/2016 | Vakanski et al. | |
| 2016/0258473 A1 | 9/2016 | Koop et al. | |
| 2016/0271805 A1 | 9/2016 | Kuolt et al. | |
| 2017/0021499 A1 | 1/2017 | Wellman et al. | |
| 2017/0036354 A1 | 2/2017 | Chavan Dafle et al. | |
| 2017/0050315 A1 | 2/2017 | Henry et al. | |
| 2017/0057091 A1 | 3/2017 | Wagner et al. | |
| 2017/0080571 A1 | 3/2017 | Wagner et al. | |
| 2017/0080579 A1 | 3/2017 | Wagner et al. | |
| 2017/0087718 A1 | 3/2017 | Wagner et al. | |
| 2017/0087731 A1 | 3/2017 | Wagner et al. | |

(56) References Cited

U.S. PATENT DOCUMENTS

| | | | |
|---|---|---|---|
| 2017/0106532 A1 | 4/2017 | Wellman et al. |
| 2017/0120455 A1 | 5/2017 | Wagner et al. |
| 2017/0121113 A1 | 5/2017 | Wagner et al. |
| 2017/0136632 A1 | 5/2017 | Wagner et al. |
| 2018/0117773 A1 | 5/2018 | Odhner et al. |
| 2018/0281202 A1 | 10/2018 | Brudniok et al. |
| 2019/0030727 A1 | 1/2019 | Nagata et al. |
| 2019/0061174 A1 | 2/2019 | Robinson et al. |
| 2019/0240847 A1 | 8/2019 | Quast et al. |
| 2020/0048014 A1 | 2/2020 | Nakayama et al. |
| 2020/0215701 A1 | 7/2020 | Takahashi et al. |
| 2020/0261176 A1 | 8/2020 | Kapadia et al. |
| 2021/0308874 A1 | 10/2021 | Gealy et al. |
| 2021/0308875 A1 | 10/2021 | Gealy et al. |
| 2022/0024056 A1 | 1/2022 | Yap et al. |
| 2022/0266458 A1 | 8/2022 | Fofonoff et al. |
| 2022/0395987 A1 | 12/2022 | Hvass et al. |

FOREIGN PATENT DOCUMENTS

| | | | | |
|---|---|---|---|---|
| CN | 104057460 A | 9/2014 | | |
| DE | 3810989 A | 8/1989 | | |
| DE | 10121344 A1 | 11/2002 | | |
| DE | 102005018207 A1 | 10/2006 | | |
| DE | 102010002317 A1 | 8/2011 | | |
| DE | 102012009011 A1 | 12/2012 | | |
| EP | 0613841 A1 | 9/1994 | | |
| EP | 1151942 A2 | 11/2001 | | |
| EP | 1256421 B1 | 11/2002 | | |
| EP | 1369364 A1 | 12/2003 | | |
| EP | 1473014 A1 | 11/2004 | | |
| EP | 1348873 B1 | 12/2004 | | |
| EP | 1671906 A1 | 6/2006 | | |
| EP | 2014587 A2 | 1/2009 | | |
| EP | 2181814 A1 | 5/2010 | | |
| EP | 2677078 A1 | 12/2013 | | |
| EP | 2796263 A2 | 10/2014 | | |
| EP | 2960024 A2 | 12/2015 | | |
| FR | 2527968 A1 | 12/1983 | | |
| FR | 2592827 A1 | 3/1988 | | |
| JP | 6155399 A | 3/1986 | | |
| JP | H0769470 A | 3/1995 | | |
| JP | 2010201536 A | 9/2010 | | |
| JP | 2014200874 A | 10/2014 | | |
| JP | 2018130810 A | 8/2018 | | |
| JP | 2020089936 A | 6/2020 | | |
| WO | 2007024607 A2 | 3/2007 | | |
| WO | 2008005060 A2 | 1/2008 | | |
| WO | 2009007053 A1 | 1/2009 | | |
| WO | 2010034044 A2 | 4/2010 | | |
| WO | 2013158480 A1 | 10/2013 | | |
| WO | 2014161549 A1 | 10/2014 | | |
| WO | 2015121668 A1 | 8/2015 | | |
| WO | 2015123128 A1 | 8/2015 | | |
| WO | 2015162390 A1 | 10/2015 | | |
| WO | 2016070412 A1 | 5/2016 | | |
| WO | 2017035466 A1 | 3/2017 | | |
| WO | 2017036812 A1 | 3/2017 | | |
| WO | 2017044632 A1 | 3/2017 | | |
| WO | 2017119982 A1 | 7/2017 | | |
| WO | 2018017616 A1 | 1/2018 | | |
| WO | WO-2019102862 A1 * | 5/2019 | .......... | B25J 15/0023 |

OTHER PUBLICATIONS

Notification Concerning Transmittal of Copy of International Preliminary Report on Patentability and the International Preliminary Report on Patentability issued by the International Bureau of WIPO in International Application No. PCT/US2021/041649 dated Feb. 2, 2023, 11 pages.

Communication pursuant to Rules 161(1) and 162 EPC issued by the European Patent Office in related European Patent Application No. 21755136.5 dated Mar. 1, 2023, 3 pages.

Notification Concerning Transmittal of Copy of International Preliminary Report on Patentability and the International Preliminary Report on Patentability issued by the International Bureau of WIPO in International Application No. PCT/US2021/041838 dated Feb. 2, 2023, 10 pages.

Communication pursuant to Rules 161(1) and 162 EPC issued by the European Patent Office in related European Patent Application No. 21752372.9 dated Mar. 1, 2023, 3 pages.

Notification Concerning Transmittal of Copy of International Preliminary Report on Patentability and the International Preliminary Report on Patentability issued by the International Bureau of WIPO in International Application No. PCT/US2021/041639 dated Feb. 2, 2023, 9 pages.

Communication pursuant to Rules 161(1) and 162 EPC issued by the European Patent Office in related European Patent Application No. 21751935.4 dated Mar. 1, 2023, 3 pages.

Communication pursuant to Rules 161(1) and 162 EPC issued by the European Patent Office in related European Patent Application No. 21755135.7 dated Mar. 1, 2023, 3 pages.

Notification of Transmittal of the International Search Report and The Written Opinion of the International Searching Authority, and the International Search Report and Written Opinion, issued by the European Patent Office (as the International Searching Authority) in related International Application No. PCT/US2021/041838 dated Nov. 22, 2021, 15 pages.

Notification of Transmittal of the International Search Report and The Written Opinion of the International Searching Authority, and the International Search Report and Written Opinion, issued by the European Patent Office (as the International Searching Authority) in related International Application No. PCT/US2021/041649 dated Nov. 24, 2021, 17 pages.

Notification of Transmittal of the International Search Report and The Written Opinion of the International Searching Authority, and the International Search Report and Written Opinion, issued by the European Patent Office (as the International Searching Authority) in related International Application No. PCT/US2021/041846 dated Nov. 22, 2021, 15 pages.

Notification of Transmittal of the International Search Report and The Written Opinion of the International Searching Authority, and the International Search Report and Written Opinion, issued by the European Patent Office (as the International Searching Authority) in related International Application No. PCT/US2021/041639 dated Nov. 22, 2021, 15 pages.

Carlisle, et al., A Pivoting Gripper for Feeding Industrial Parts, IEEE 1994, pp. 1650-1755.

Herbert et al., A Robotic Gripper System for Limp Material Manipulation: Hardware and Software Development and Integration, Proc. Of IEEE, Int'l Conf on Robotics & Automation, Apr. 1997, pp. 15-21.

Klingbeil et al., Grasping with Application to an Autonomous Checkout Robot, retrieved from https://www.researchgate.net/publication/224252695 on Jul. 11, 2016, 9 pages.

Liu et al., Hard-Arm Coordination for a Tomato Harvesting Robot Based on Commercial Manipulator, Proc. Of IEEE—Int'l Conf. on Robotics and Biometrics, Dec. 2013, pp. 2715-2720.

Moura et al., Neural Network Based Perturbation Identification Approach for High Accuracy Tracking Control of Robotic Manipulators, Proc. Of IMECE—ASME Int'l Mech. Eng. Cong., Nov. 15-21, 2003, pp. 1189-1197.

Non-Final Office Action issued by the United States Patent and Trademark Office in related U.S. Appl. No. 17/376,998 dated Jul. 25, 2023, 12 pages.

Non-Final Office Action issued by the United States Patent and Trademark Office in related U.S. Appl. No. 17/375,763 dated May 10, 2023, 10 pages.

Non-Final Office Action issued by the United States Patent and Trademark Office in related U.S. Appl. No. 17/377,004 dated May 10, 2023, 8 pages.

Vittor et al., Flexible Robotic Gripper for Automation of Assembly Tasks: A Technology Study on a Gripper for Operation in Shared Human Environment, Proc. Of ASME—Dynamic Sys. and Control Div., DSC—vol. 72-2, Nov. 2003, 7 pages.

(56) References Cited

OTHER PUBLICATIONS

Notice on the Second Office Action, along with its English translation, issued by the China National intellectual Property Administration in related Chinese Patent Application No. 202110784128.1 dated Dec. 18, 2023, 20 pages.

* cited by examiner

US 11,938,618 B2

SYSTEMS AND METHODS FOR OBJECT PROCESSING USING A PASSIVELY FOLDING VACUUM GRIPPER

PRIORITY

The present application claims priority to U.S. Provisional Patent Application Ser. No. 63/054,856 filed Jul. 22, 2020, the disclosure of which is hereby incorporated by reference in its entirety.

BACKGROUND

The invention generally relates to programmable motion systems and relates in particular to end effectors for programmable motion devices (i.e., robotic systems) for use in object processing such as object sortation and object distribution.

End effectors for robotic systems, for example, may be employed in certain applications to select and grasp an object, and then move the acquired object very quickly to a new location. Applications might include picking items from a tote of items, and then placing the object in another tote or other location. In many, applications and in order to increase the range of suitable applications, the robotic picking system must be able to pick a very large range of types of objects. It is therefore desirable to have the end-of-arm tool be able to grip as many different types of objects as is possible.

There are many kinds of end-of-arm tools for grasping items, including parallel grippers or finger-based grippers, as well as universal gripper or jamming gripper that uses a fluidized bed concept inside a bag, electroadhesive grippers, as well as vacuum grippers. Vacuum grippers employ vacuum pressure for acquiring and securing objects for transport or subsequent operations by articulated arms. Vacuum grippers however, generally require having a good seal with an object, but ensuring a good seal sometimes requires that the particular suction cup be selected to correspond to the object being grasped. Additionally, grasping certain objects, such as plastic bags, may require a specific type of end effector to ensure that the plastic bag does nor peel off of the end effector or collapse under the force of the end effector and thereby break the bag and/or the seal. Further, the lifting force may be limited by an amount proportional to the area of contact of the suction cup in a vacuum system, and the vacuum itself may damage some objects.

Other techniques for acquiring and securing objects employ electrostatic attraction, magnetic attraction, needles for penetrating objects such as fabrics, fingers that squeeze an object, hooks that engage and lift a protruding feature of an object, and collets that expand in an opening of an object, among other techniques. Prehensile grippers, or finger-like grippers, for example, are sometimes used for grasping objects, but such systems also face challenges in certain applications. Such systems generally require two opposing surfaces in opposition to grasp an object, and finger-like grippers are mechanically complicated, typically requiring multiple parts as well as an actuation mechanism to close and open the fingers.

End effectors are generally designed as a single tool, such as for example, a gripper, a welder, or a paint spray head, and the tool is typically designed for a specific set of needs. There remains a need for an end effector in a programmable motion system that may readily and reliably select and grasp an object, and then move the acquired object very quickly to a new location. There further remains a need for an end-effector gripper that is able to grip a wide range of objects, with different materials and textures, where suitable grasp poses are abundant, that can lift loads beyond the limits attainable by suction grippers, that does not damage the object being lifted, that is mechanically simple, and that is small and compact and does not unintentionally grab multiple items.

SUMMARY

In accordance with an aspect, the invention provides an end-effector for a programmable motion device. The end effector includes a body that includes a contact portion, the body providing an open interior through which a vacuum may be provided to the contact portion, and the body includes at least one feature that is adapted to facilitate the contact portion to become substantially non-planar while grasping.

In accordance with another aspect, the invention provides an end-effector for a programmable motion device. The end effector includes a body that includes a contact portion, and the body provides an open interior through which a vacuum may be provided to the contact portion. The body also includes at least one feature that is adapted to facilitate the contact portion to bend along at least one bend path while grasping.

In accordance with a further aspect, the invention provides a method of grasping an object with an end-effector that includes a body that provides an open interior coupled to a vacuum. The method includes contacting a contact portion of the body with the object, applying a vacuum through the contact portion to the object to primarily engage the object through tension force between the contact portion and the object, and permitting the contact portion of the body to bend along at least one bend path while grasping the object such that the object becomes primarily engaged with the object via a shear force that is greater than the tension force between the contact portion and the object.

BRIEF DESCRIPTION OF THE DRAWINGS

The following description may be further understood with reference to the accompanying drawings in which.

The drawings are show for illustrative purposes only.

DETAILED DESCRIPTION

In accordance with an aspect, the invention provides an end-effector for a programmable motion device, wherein the end effector includes a contact surface supported by a support housing for flexibly supporting the contact surface such that the support housing is adapted to facilitate the contact surface to become non-planar while grasping.

Figure 1:
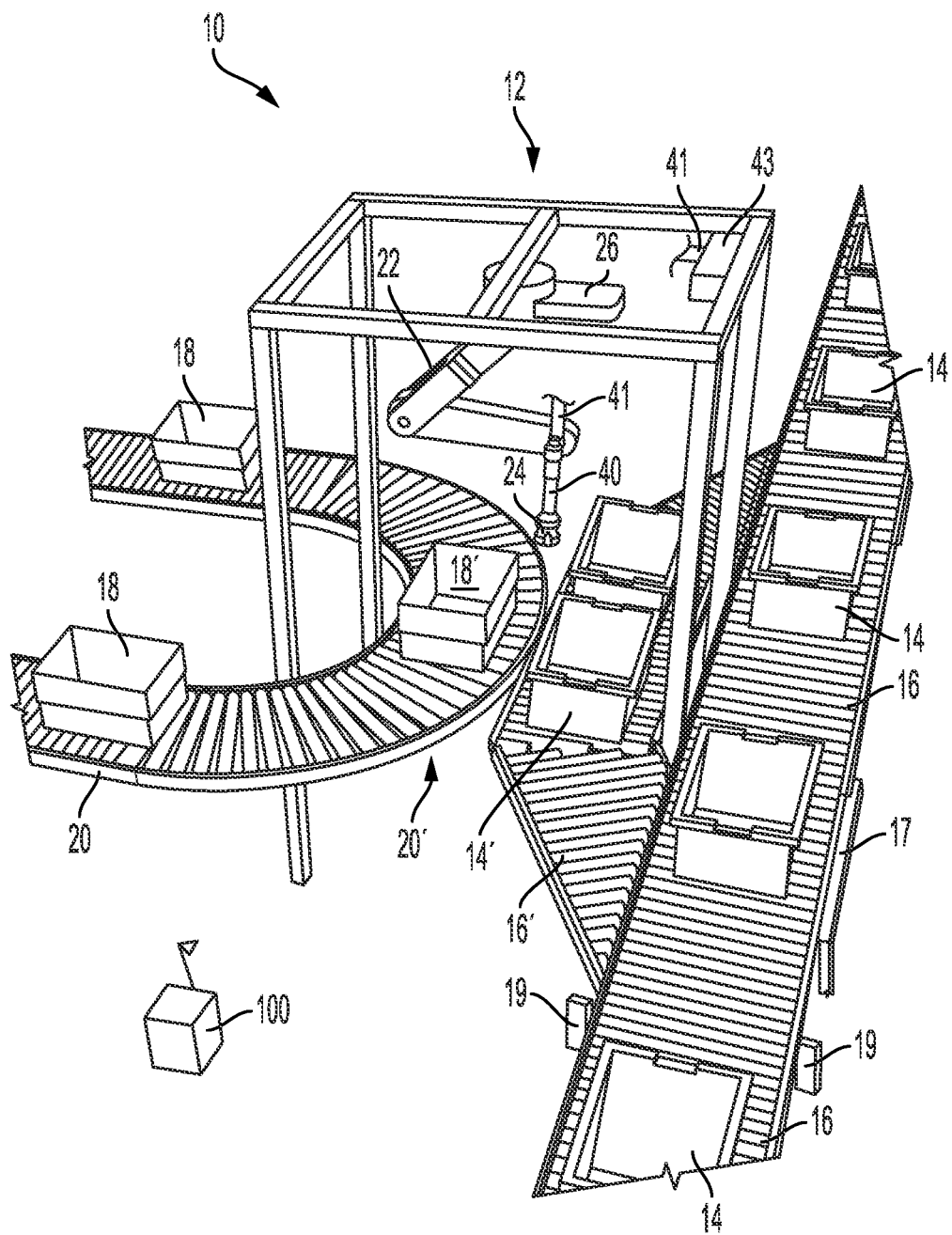
FIG. 1 shows and illustrative diagrammatic view of an object processing system including a programmable motion device with an end effector in accordance with as aspect of the present invention.

The end-effector may be used with a programmable motion device in an object processing system. FIG. 1 for example, shows an object processing system 10 that includes an object processing station 12 between an infeed conveyor 16 that carries infeed bins 14, and a destination conveyor 20 that carries destination containers 18. The object processing station 12 includes a programmable motion device (e.g., an articulated arm 22) with an attached end-effector 24 as well as an associated perception system 26. The perception system 26 is positioned to perceive objects (and/or associated indicia) in selected infeed bins 14' that are diverted (selected) by diverter 17 to move along selected infeed conveyor 16'. The perception system 26 is positioned as well to perceive destination containers 18' that are provided on a processing destination conveyor section 20' of the destination conveyor 20. Operation of the system is controlled by one or more computer processing systems 100 that communicate with the conveyors 16, 16' diverter 17, conveyor 20, programmable motion device 22 (including the end-effector 24) and perception system 26.

The object processing station 12 includes an infeed conveyor section 16' that circulates supply bins 14' from and back to the infeed conveyor 16 using the diverter 17. The end-effector 24 of the programmable motion device 22 is programmed to grasp an object from the a supply bin 14', and move the object to deliver it to a desired destination bin 18 on the destination conveyor load area 20' by placing or dropping the object into the destination container 18' at the destination conveyor load area 20'. The supply bin 14' may then be returned to the input conveyor 16 and, optionally, may be brought to a further processing station. At the processing station 12 therefore, one or more vendor supply bins 14 are routed to an input area, and the programmable motion device 22 is actuated to grasp an object from a bin 14', and to place the object into a selected destination container 18'. The processed vendor bins 14' are then returned to the common input stream on the conveyor 16, and the destination container 18' is moved further along the destination conveyor 20.

The system 10 may also include one or more perception units 19 located on or near the infeed conveyor 16 for identifying indicia on an exterior of each of the bins 14, providing perception data from which the contents of the bin may be identified, and then knowing its relative position on the conveyor 16, track its location. It is assumed, in accordance with an aspect, that the bins of objects are marked in one or more places on their exterior with a visually distinctive mark such as a barcode (e.g., providing a UPC code), QR code, or radio-frequency identification (RFID) tag or mailing label so that they may be sufficiently identified with a scanner for processing. The type of marking depends on the type of scanning system used, but may include 1D or 2D code symbologies. Multiple symbologies or labeling approaches may be employed. The types of scanners employed are assumed to be compatible with the marking approach. The marking, e.g. by barcode, RFID tag, mailing label or other means, encodes a identifying indicia (e.g., a symbol string), which is typically a string of letters and/or numbers. The symbol string uniquely associates the vendor bin with a specific set of homogenous objects. Based on the identified code on an infeed bin 14', the system may either permit a bin 14 to continue along the infeed conveyor 16, or using diverter 17, may direct the selected bin 14' onto the selected infeed conveyor 16'.

On the selected infeed conveyor 16' at the object processing station 12, the perception system 26 assists (using the central control system 100—e.g., one or more computer processing systems) the programmable motion device 22 including the end-effector 24 in locating and grasping an object in the infeed bin 14'. In accordance with further aspects, each object may also be marked with a visually distinctive mark, again such as a barcode (e.g., providing a UPC code), QR code, or radio-frequency identification (RFID) tag or mailing label so that they may be sufficiently identified with a scanner for processing. The type of marking depends on the type of scanning system used, but may include 1D or 2D code symbologies. Again., multiple symbologies or labeling approaches may be employed on each object.

Figure 2:
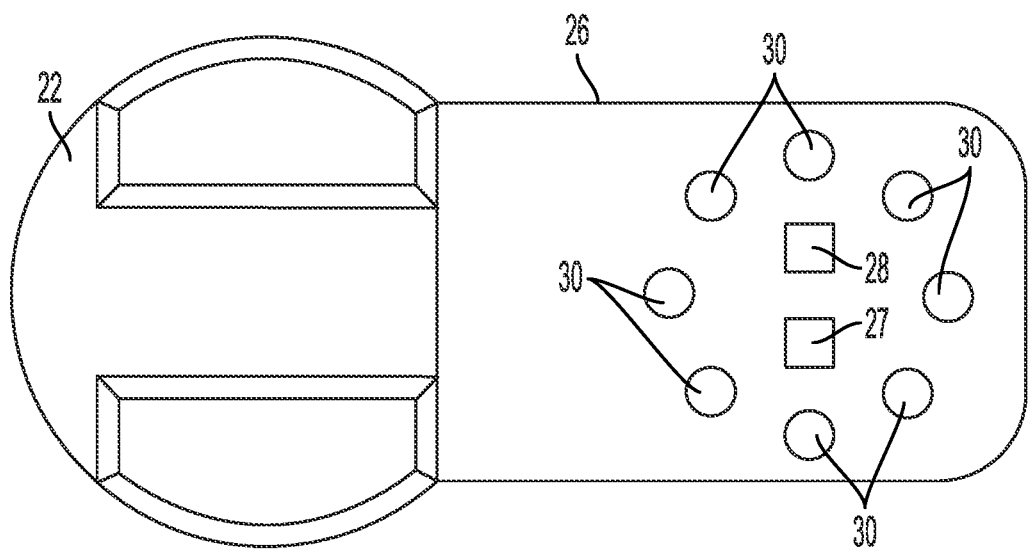
FIG. 2 shows an illustrative diagrammatic underside view of the perception system of FIG. 1.

With reference to FIG. 2, the perception system 26 that looks down in the object processing station 12 perceives perception data from one or more objects within the selected infeed bin 14' on the selected infeed conveyor 16'. The perception system 26 is mounted above a bin of objects to be processed next to the base of the articulated arm 22, looking down into a bin 14'. The perception system 26, for example and as shown in FIG. 2, may include (on the underside thereof), a camera 26, a depth sensor 28 and lights 30. A combination of 2D and 3D (depth) data is acquired. The depth sensor 28 may provide depth information that may be used together with the camera image data to determine depth information regarding the various objects in view. The lights 30 may be used to remove shadows and to facilitate the identification of edges of objects, and may be all on during use, or may be illuminated in accordance with a desired sequence to assist in object identification. The system uses this imagery and a variety of algorithms to generate a set of candidate grasp locations for the objects in the bin as discussed in more detail below.

Figure 3:
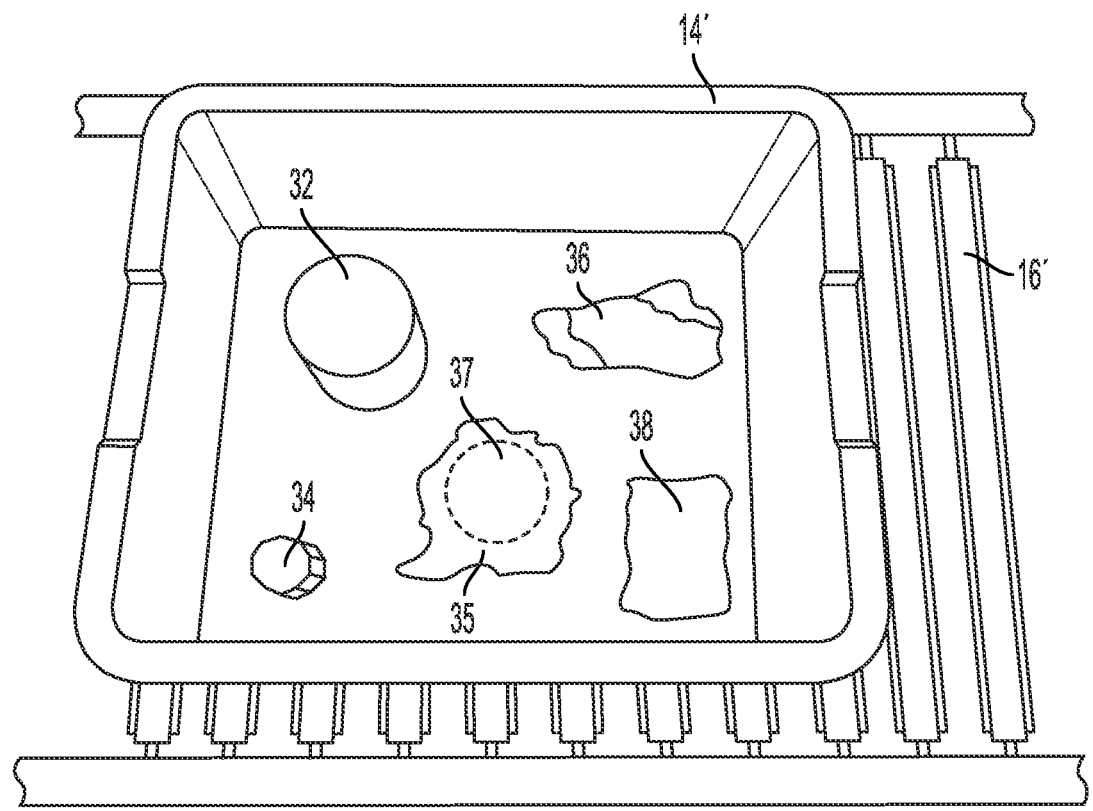
FIG. 3 shows an illustrative diagrammatic view of a bin of objects to be processed from the perception system of FIG. 1.

FIG. 3 shows a view of the bin 14' from the perception system 26. The image view shows the bin 14' (e.g., on the conveyor 16'), and the bin 14' contains objects 32, 34, 36 and 38, some of which objects 35, 36 and 38 are provided in flexible packaging such as bags, and may include one or more heavy e.g., objects 37, possibly loosely within a bag 35. Additionally, certain objects provided in a bag (e.g., 36) may have portions of the bag folded over other portions of the bag. While in certain systems, the objects in each infeed bin may be homogenous, in other systems, such as shown in FIG. 3, the objects may be non-homogenous. The system will identify candidate grasp locations on one or more objects, and may not try to yet identify a grasp location for the object that is partially obscured by other objects. Candidate grasp locations may be indicated using a 3D model of the robot end effector placed in the location where the actual end effector would go to use as a grasp location. Grasp locations may be considered good, for example, if they are close to the center of mass of the object to provide greater stability during grasp and transport, and/or if they avoid places on an object such as caps, seams etc. where a good vacuum seal might not be available.

If an object cannot be fully perceived by the detection system, the perception system considers the object to be two different objects, and may propose more than one candidate grasps of such two different objects. If the system executes a grasp at either of these bad grasp locations, a number of errors may occur. The grasp may either fail to acquire the object due to a bad grasp point where a vacuum seal will not occur, or will acquire the object at a grasp location that is very far from the center of mass of the object (and thereby induce a great deal of instability during any attempted transport). Each of these results is undesirable.

If a bad grasp location is experienced, the system may remember that location for the associated object. By identifying good and bad grasp locations, a correlation is established between features in the 2D/3D images and the idea of good or bad grasp locations. Using this data and these correlations as input to machine learning algorithms, the system may eventually learn, for each image presented to it, where to best grasp an object, and where to avoid grasping an object.

Again, the operations of the system described above are coordinated with a central control system 100 that again communicates (e.g., wirelessly) with the articulated arm 22, the perception units 19, 26, 28 and 30, as well as in-feed conveyors 16, 16', diverter 17 and destination conveyor 20. This system determines from symbol strings the UPC associated with a vendor bin, as well as the outbound destination for each object. The central control system 100 is comprised of one or more workstations or central processing units (CPUs). For example, the correspondence between UPCs or mailing labels, and outbound destinations, is maintained by a central control system in a database called a manifest. The central control system maintains the manifest by communicating with a warehouse management system (WMS). The manifest provides the outbound destination for each inbound object.

Figure 4:
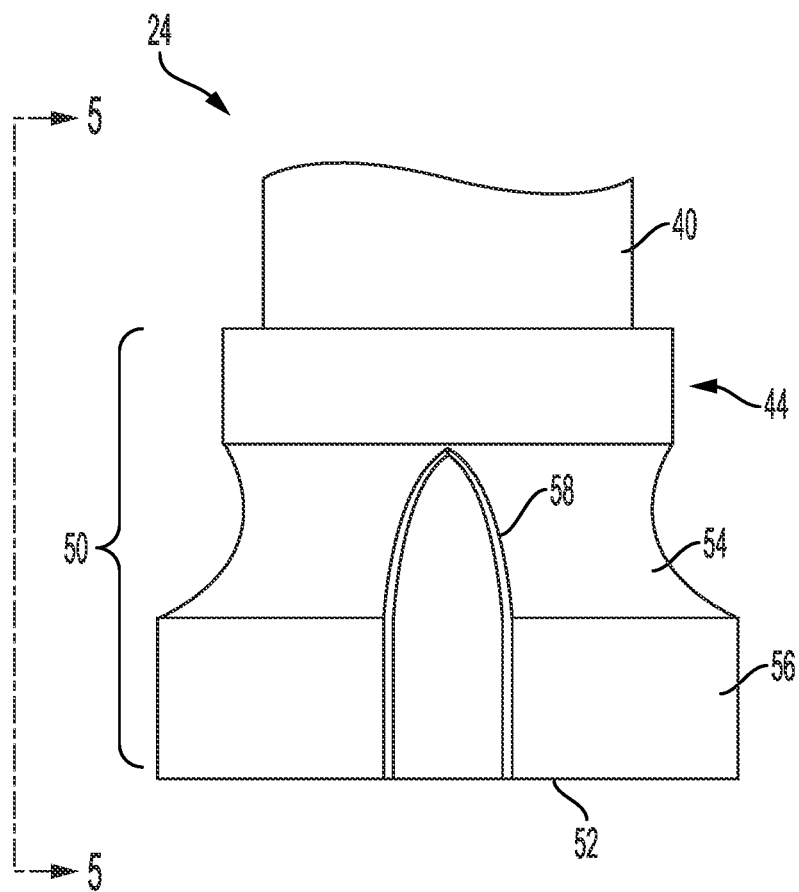
FIG. 4 shows an illustrative diagrammatic front view of the passively folding vacuum gripper end effector of FIG. 1 in accordance with an aspect of the present invention.

The end-effector 24 of FIG. 1 is coupled to the end-effector mounting section of the programmable motion device 22. As shown in FIG. 4, the end-effector 24 provides a passively folding vacuum gripper that passively folds portions (e.g., jaws or fingers) around items such as non-rigid items (e.g. bags) or small cylindrical items (e.g. pens) that require a prehensile grip, but otherwise acts like a suction cup with flat rigid items (e.g. boxes). This passively folding vacuum gripper automatically adapts to the item without any actuation other than the switching of the vacuum source; it functions like a multi-fingered hand when it needs to, and functions like a suction cup when it needs to do so.

Figure 5:
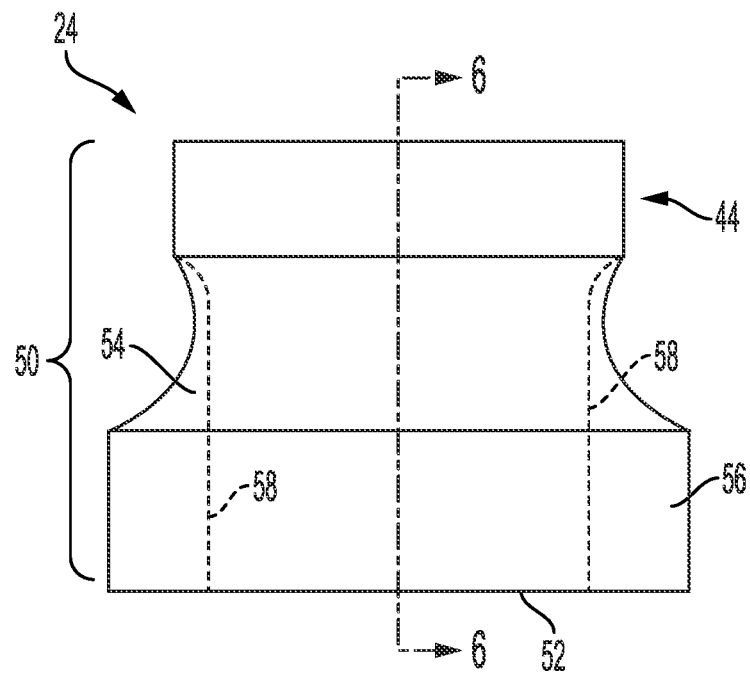
FIG. 5 shows an illustrative diagrammatic side view of the end effector of FIG. 4 taken along line 5-5 thereof.
Figure 6:
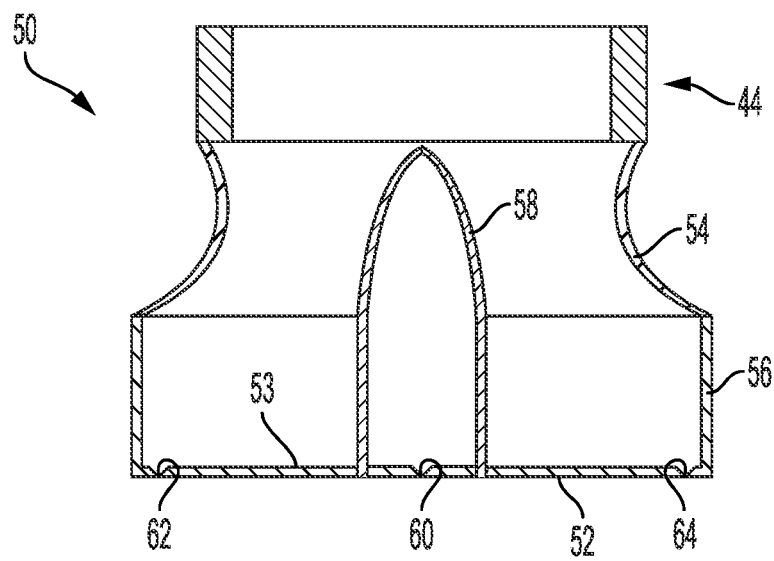
FIG. 6 shows an illustrative diagrammatic sectional view of the end effector of FIG. 5 taken along line 6-6 thereof.
Figure 8:
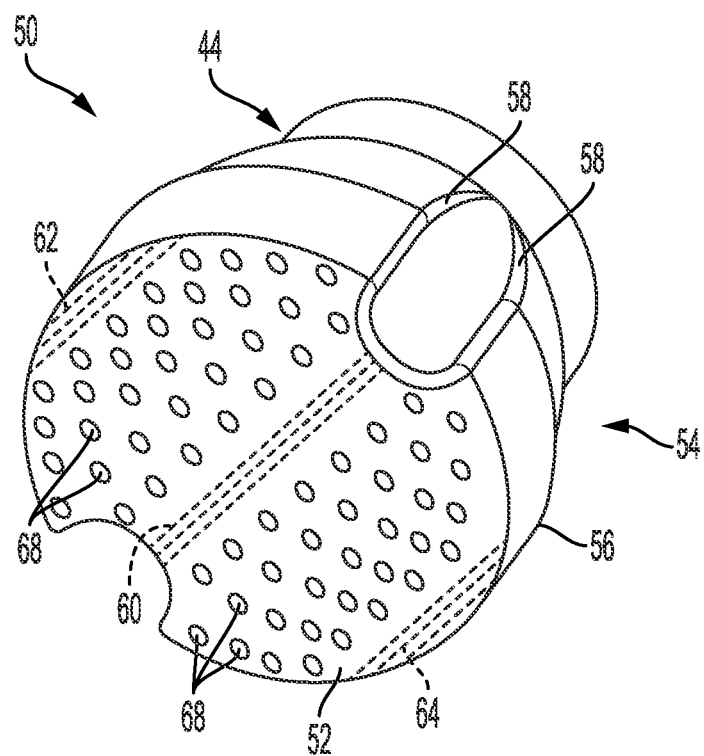
FIG. 8 shows an illustrative diagrammatic elevation isometric view of the end effector of FIG. 4.
Figure 9:
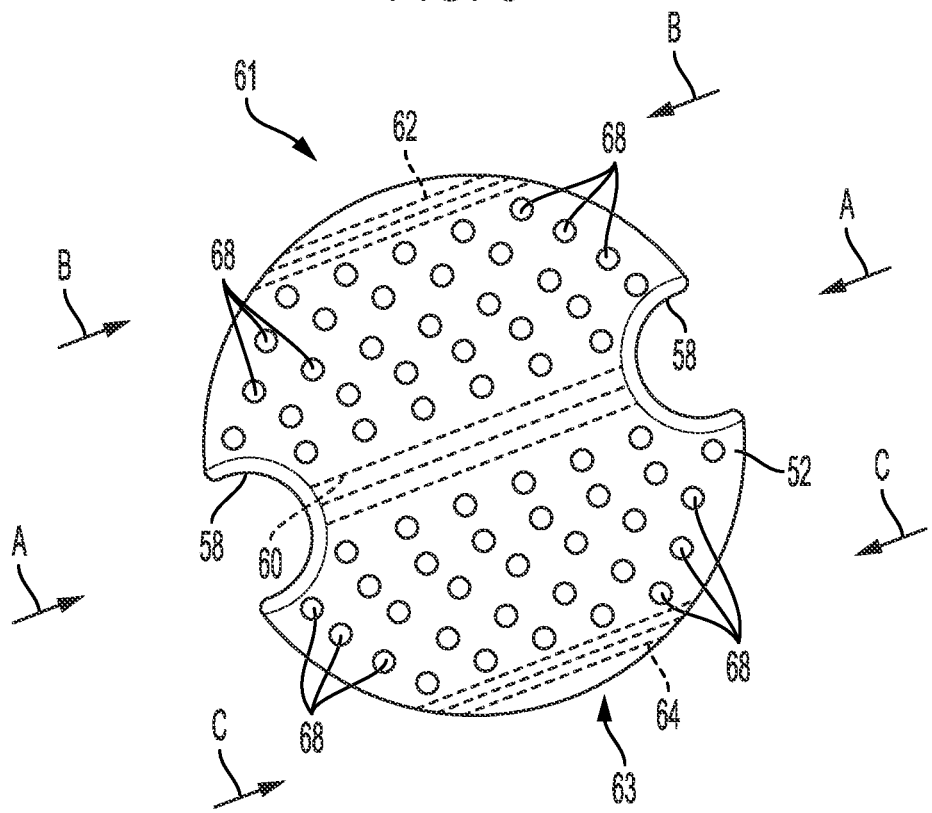
FIG. 9 shows an illustrative diagrammatic bottom view of the end effector of FIG. 4.

In particular, the end-effector 24 includes a connection portion 44 for coupling to the end-effector mounting section 40 (also shown in FIG. 1). The end effector 24 also includes a body 50 including a contact portion 52 as well as an upper portion 54 coupled to the connection portion 44 and lower portion 56 coupled to the contact portion 52. The body 50 also includes a pair of features 58 (as also shown in FIGS. 5, 8 and 9) that facilitate the contact portion 52 becoming non-planar as discussed further below. FIG. 5 shows a side view of the end effector 24, showing the inset features 58. FIG. 6 shows a sectional view of the end-effector 24 taken along line 6-6 of FIG. 5. As shown in FIG. 6 the contact portion 52 includes features 60, 62, 64 in the form of V-shaped grooves on the inside surface 53 of the contact portion 52 as shown.

Figure 7:
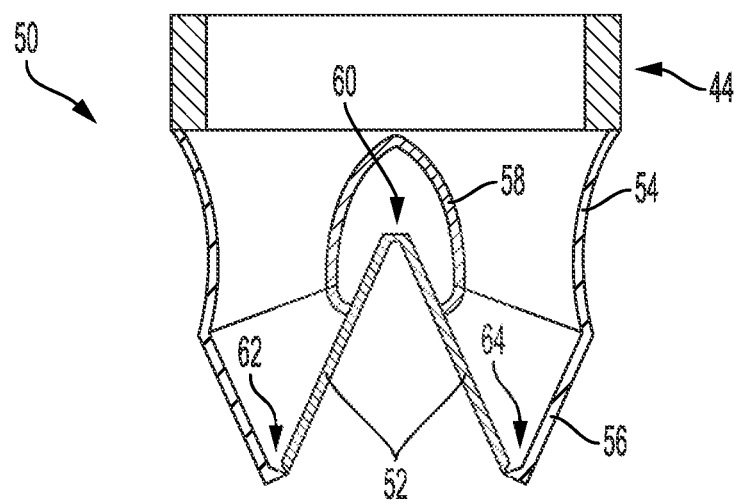
FIG. 7 shows an illustrative diagrammatic sectional view of the end effector of FIG. 6 is a gripping position.

With reference to FIG. 7, when an object is grasped by the end-effector 24, the body 50 is permitted to change its shape dependent on the object being grasped. The gripper folds its fingers because of its shape. The shape and thickness of its walls, and the evacuation of the open interior cavity causes the gripper's fingers to fold inward when the suction cups' ports are sealed. The mechanical actuation that causes the gripper to fold is passive, and is achieved by the vacuum only. There are no motors, gears or other mechanisms employed that cause the fingers to fold, yet the passive mechanical actuation provides a multi-fingered hand when it needs to do so, and provides a suction cup when it needs to do so.

The contact portion includes apertures 68 that provide a vacuum to the outside surface of the contact portion 52 through the open interior of the body 50. Generally, the vacuum is provided from the apertures 68 through the opening in the connection portion 44 and the mounting section 40 through a hose 41 to a vacuum source 43 shown in FIG. 1.

In accordance with certain aspects, the vacuum source 43 may be switchable to change to a source of positive air pressure that is pushed from the source 43 to the apertures 68 to urge both an object away from the contact surface 52 and to push the contact surface distally. In accordance with further aspects, in addition to being formed of flexible material, the body may be formed of a material and shape that provides a desired spring constant. The desired spring constant may provide that the body 50 is biased to the shape shown in FIGS. 4 and 5 such that when deformed (as discussed herein), the body 50 will act against any deformation, at least partially assisting in causing the body 50 to return to its original shape (again, shown in FIGS. 4 and 5).

FIG. 8 shows the outside surface of the contact portion 52, showing the apertures 68 as well as the (in dashed form) the V-shaped channel features 60, 62, 64 on the inside surface of the contact portion 52. With further reference to FIG. 9, V-shaped channel feature 60 extends between opposing features 58 and facilitate the contact portion 52 bending along the center of the contact portion as generally indicated at A. The V-shaped channel features 62, 64 facilitate the contact portion 52 bending near the lower portion 56 as generally indicated at B and C. In the example of FIGS. 4-9 the features 58, 60, 62 and 64 cooperate to provide the body 50 with sufficient flexibility that the end-effector may respond when grasping a flexible object by folding as discussed above. This movement and bending permits the contact portion 52 to become non-planar, and the sides 61, 63 to be drawn toward each other in the process. In accordance with further embodiments, various combinations of features (and even certain features individually) may be employed to facilitate bending of the contact surface. This bending of the contact surface changes the adhesion dynamic between the object (e.g., a flexible bag) and the end-effector as discussed in more detail below.

Figure 12:
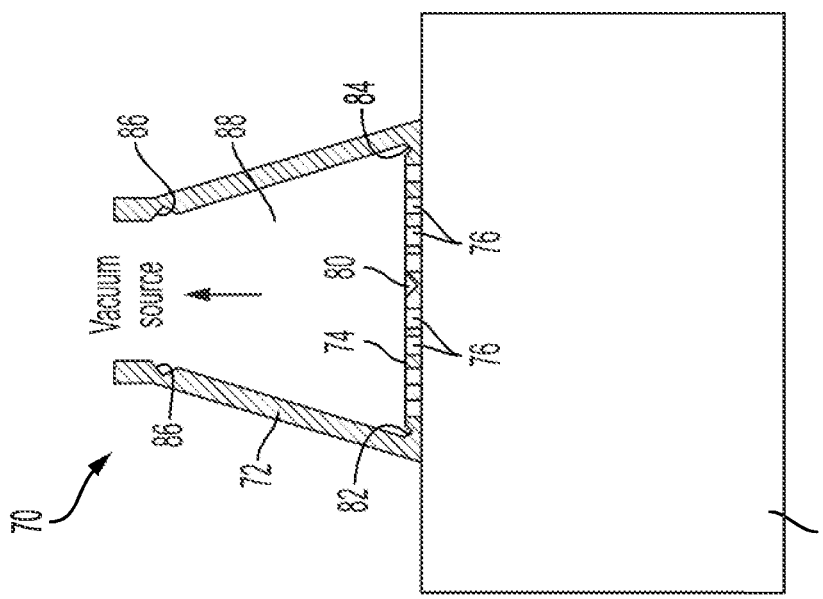
FIG. 12 shows an illustrative diagrammatic representative sectional view of the end effector of FIG. 10 while grasping a rigid object.
Figure 11:
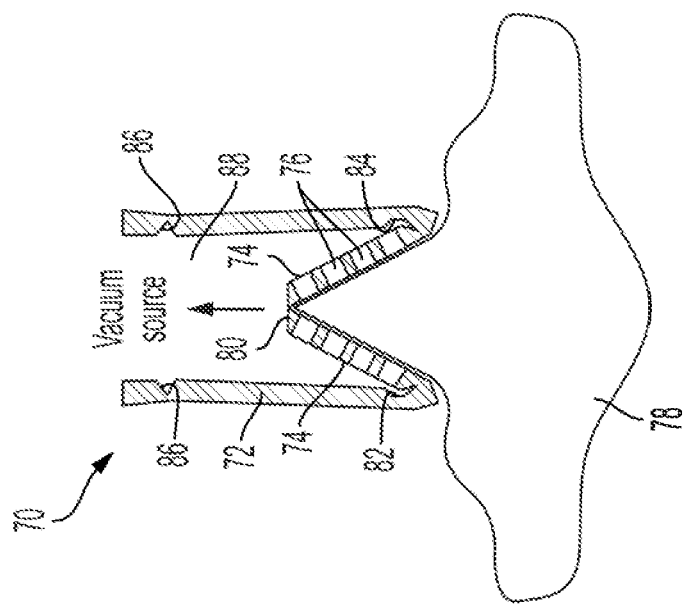
FIG. 11 shows an illustrative diagrammatic representative sectional view of the end effector of FIG. 10 while grasping a deformable object.
Figure 10:
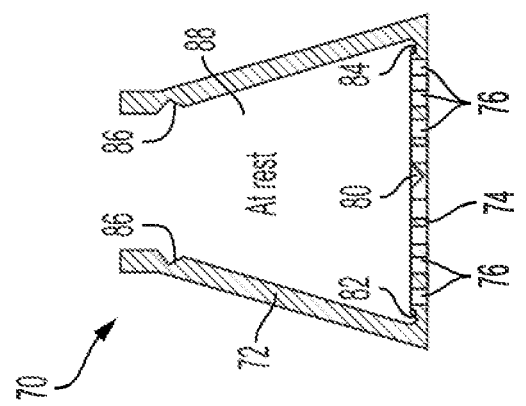
FIG. 10 shows an illustrative diagrammatic representative sectional view of an end effector in accordance with various aspects of the invention at rest.

FIG. 10 shows an end-effector 70 at rest that includes a body 72 with a contact portion 74. The contact portion 74 includes apertures 76 through which vacuum is provided, as well as V-shaped channels 80, 82, 84 that are similar to V-shaped channel features 60, 62, 64. The body 72 also includes channel feature 86 that facilitates the body 72 becoming narrowed during deformation grasping. FIG. 11, for example, shows the end-effector 70 grasping a deformable object 78 using vacuum applied through the apertures 76 in the contact portion 74. The channel features 80, 82, 84, 86 make it easier for the end-effector 70 to cause the contact portion 74 to bend under the vacuum while grasping the deformable object 78. With reference to FIG. 12, when a non-deformable (e.g., rigid) object 79 is grasped, the end-effector does not bend, but rather the contact portion 74 of the end effector remains with the rigid object 79. The gripper does not fold for rigid items. The face of the gripper may include many small apertures, which may vary in size and distribution. Larger apertures may also be provided in the center of the contact portion to permit a higher volume of air to travel through the center of the contact portion in order to assist in counterbalancing any folding forces in the case of rigid objects.

In accordance with various aspects therefore, the invention provides a passively folding vacuum gripper that securely grips bagged object, securely grips rigid objects (even rigid objects with curved surfaces, and mitigates damage to objects that may be provided by conventional vacuum grippers.

Figure 13:
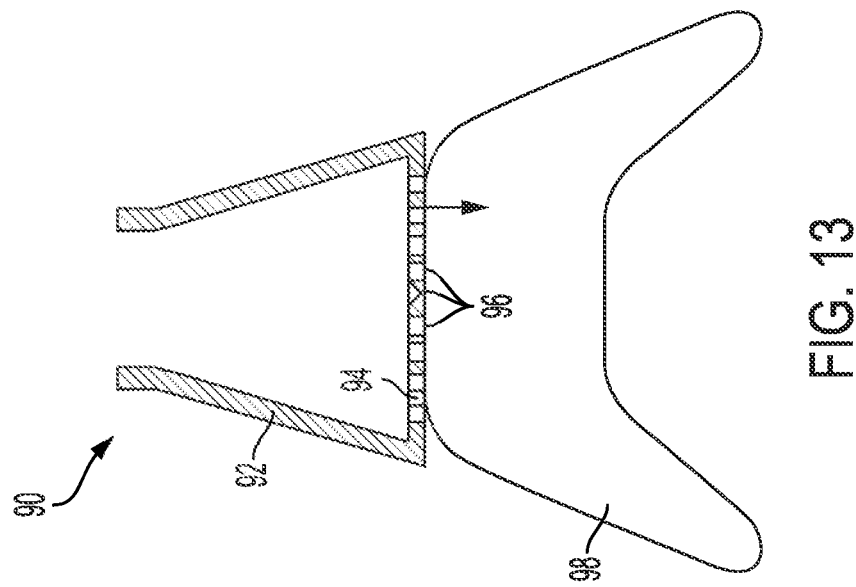
FIG. 13 shows an illustrative diagrammatic representative sectional view of a rigid cup end effector attempting to grasp a deformable object.

With respect to bagged items in loosely packed plastic bagging for example, when the apertures are blocked by loose plastic bagging, the inner volume of the gripper is evacuated, and the gripper walls and mating surface bend inward as described above. Normally, a rigid suction cup with small apertures cannot easily grip loose bags because the plastic film easily peels away. FIG. 13 for example shows a rigid vacuum cup end-effector 90 including a body with a contact portion 94 having vacuum apertures 96. When the rigid vacuum cup is used to try to lift an unstable bag 98, a portion or portions of the bag at the periphery of the contact region may easily peel away from the contact portion where the angle of contact between the bag and the end-effector is less than 180 degrees. Pulling on the film easily overcomes the small vacuum force on the remaining part of the package; this results in a cascade of grip failures at each aperture.

In the case of the two-fingered gripper (discussed above), the folding suction cup pulls the bag into a pinching crease that holds the bag. In the case of a three-fingered gripper (discussed below), as the film is pulled into a conical shape, it is held in part by friction as the film drags across the surface of the folding suction cup. In addition, the plastic film in its conical shape is less likely to peel away from the suction cup because the edge of the cone makes an angle greater than 180 degrees, and swaying does not tend to make this angle go below 180 degrees.

Figure 14:
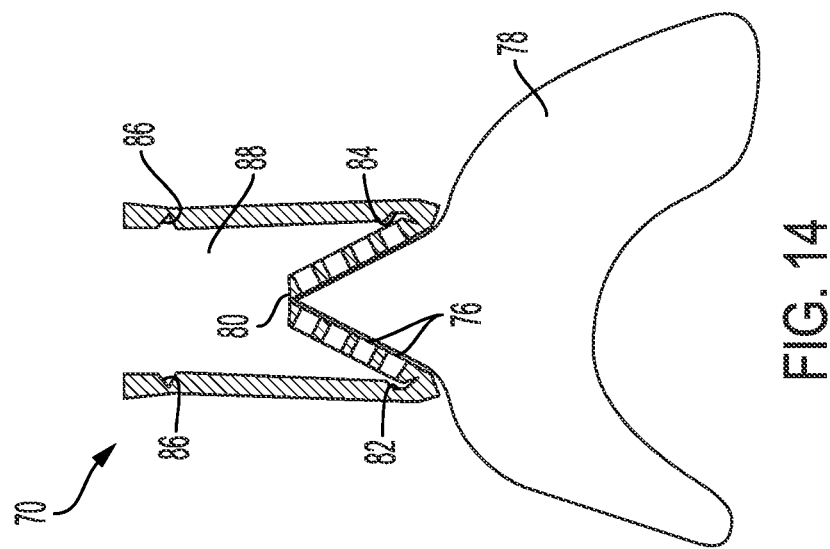
FIG. 14 shows an illustrative diagrammatic representative sectional comparative view of the end effector of FIG. 10 while grasping the deformable object of FIG. 13.

FIG. 14, for example shows the gripper 70 grasping a deformable object 78 using vacuum applied through the apertures 76 in the contact portion 74. The channel features 80, 82, 84, 86 make it easier for the end-effector 70 to cause the contact portion 74 to bend under the vacuum while grasping the deformable object 78. Significantly, the retention force between the bag and the end-effector is not limited to the tensile strength of any vacuum adhesion, but additionally relies on shear forces provided by the angled contact portion in resisting any sliding downward of the bag with respect to the contact portion. This provides a much more stable grasp.

With respect to flat, rigid objects such as box faces, the end-effector may operate in a manner similar to traditional vacuum cups on rigid surfaces (i.e., without shape changing) when necessary. In particular, when the gripper mates with a flat surface, the rigidity of the gripped item prevents the gripper from changing shape or folding, and all of the apertures expose vacuum to the flat surface. The distribution of the sizes of the ports can be chosen so that the force in the center (e.g. the central triangle in the case of the three-fingered gripper discussed below) counterbalances folding forces, so that the entire surface stays in contact with the item. With respect to curved, rigid objects such as blister packs, and small cylindrical objects such as pens, the folding action allows the fingers to wrap around small items. End-effectors of various aspects of the invention also mitigate damage traditional vacuum gripping create by providing support to packaging material.

When the vacuum source is turned off, the surfaces that had been bent return to their original state—i.e., the gripper unfolds to its original shape. Shape change is achieved passively via use of a movement of the end-effector with respect to various features triggered by blockage of gripper apertures when under vacuum. In certain applications, a source of positive air pressure may be provided by switching the vacuum line to a positive pressure air source to facilitate urging objects from the end effector and/or more quickly causing the end effector to return to its pre-gripping shape.

Figure 15:
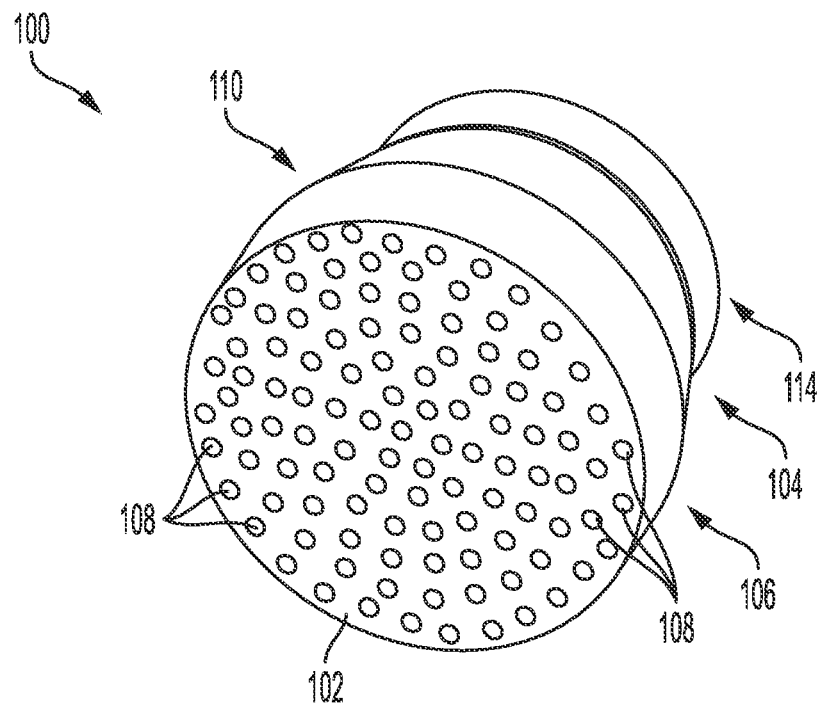
FIG. 15 shows an illustrative diagrammatic elevational isometric view of an end effector in accordance with another aspect of the invention that includes bend features in the contact surface of the end effector.
Figure 16:
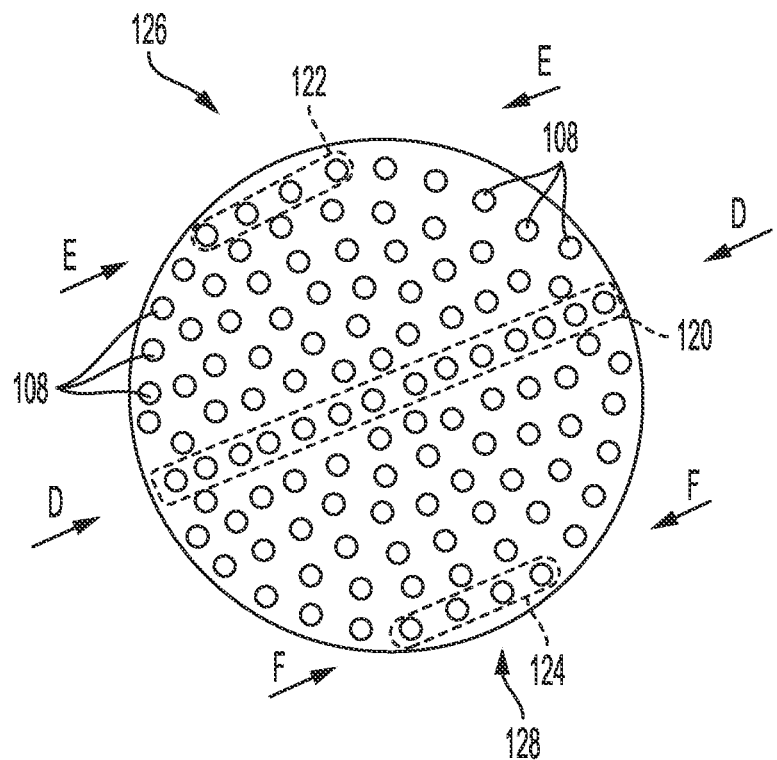
FIG. 16 shows an illustrative diagrammatic bottom view of the end effector of FIG. 15.

FIG. 15 shows an end-effector 100 in accordance with another aspect of the present invention that includes bend features only on the contact portion of the body. In particular, the end-effector 100 includes a body 110 with a connection portion 114 for coupling to the end-effector mounting section 40 (shown in FIG. 1). The body 110 also includes a contact portion 102 proximate a lower portion 106, and an upper portion 104 proximate the connection portion 114. The end-effector 100 is similar to the end-effector shown in FIG. 8 except that the end-effector 100 includes no features 58 (of FIG. 8) in the portions 104, 106, and includes no V-shaped channel features 60, 62, 64 (of FIG. 8) in the contact portion 102. With the end-effector of FIG. 15 (and with further reference to FIG. 16), the features that facilitate bending of the contact surface include the particular layout of the apertures 108.

The group of apertures 120 form a line generally indicated at D-D, and provide that the contact surface will favor bending along the line generally indicated at D-D. The group of apertures 122 also form a line (though shorter) generally indicated at E-E, and provide that the contact surface will favor bending along the line generally indicated at E-E. The group of apertures 124 also form a short line generally indicated at F-F, and provide that the contact surface will favor bending along the line generally indicated at F-F. The line of apertures 120 is designed to permit the contact portion of the end-effector to bend into the open interior (similar to the bending of the end-effector contact portion 52 along the channel 60) along the line D-D, and the lines of apertures 122, 124 are designed to permit the contact portion to bend (similar to the bending of the end-effector contact portion 52 along the channels 62, 64) along the lines E-E and F-F. This movement and bending permits the contact portion 102 to become non-planar, and the sides 126, 128 to be drawn toward each other in the process.

Figure 17:
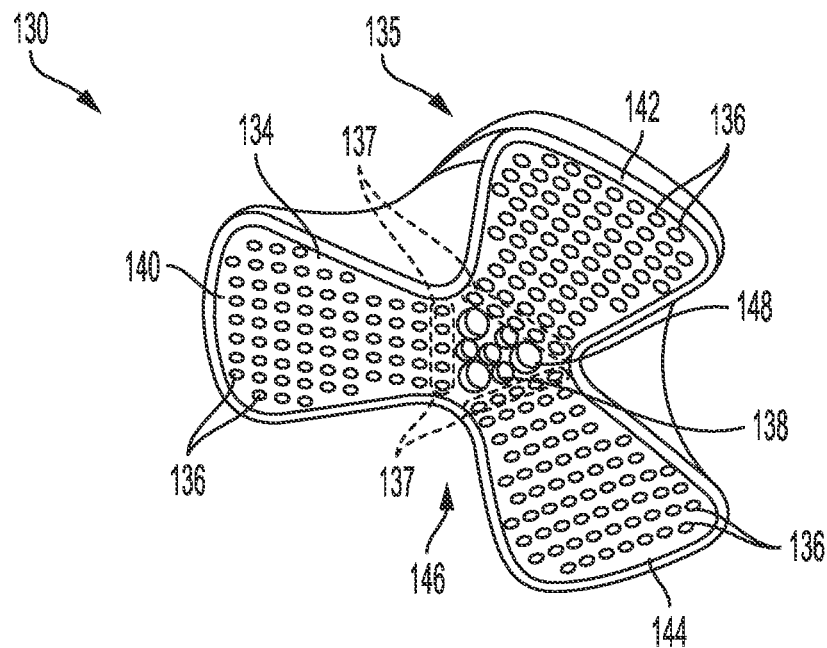
FIG. 17 shows an illustrative diagrammatic elevational isometric view of an end effector in accordance with a further aspect of the present invention that includes three finger portions associated with the contact surface.

The above described end-effectors may generally be referred to as two finger (or jawed) end-effectors in that two portions close upon one another in grasping. As also noted above, such techniques may also be used with three or more fingered end-effectors. FIG. 17, for example, shows a three fingered end-effector 130 that includes a body with a connection portion 135 for coupling to a mounting section 40 of an articulated arm 22 (shown in FIG. 1), and a contact section 134 for contacting an object to be grasped. The contact section 134 may generally include three extension sections 140, 142, 144 that join in a central region 146. While the three extension sections may include apertures 136 of a fixed smaller size, the central region 146 may include larger apertures 138 and largest apertures 148 that are central to the three extension sections as shown. The larger size of the apertures in the central region facilitates the central region remaining flat when engaging a flat rigid surface. The end-effector 130 provides that the apertures 137 along a line of each extension section adjacent the central region 146 provide features that facilitate bending of each extension section with respect to the central region. As the apertures 136 are provided in rows along the extension sections, each later row may also provide additional features that facilitate bending of each extension section with respect to the central region.

Figure 18:
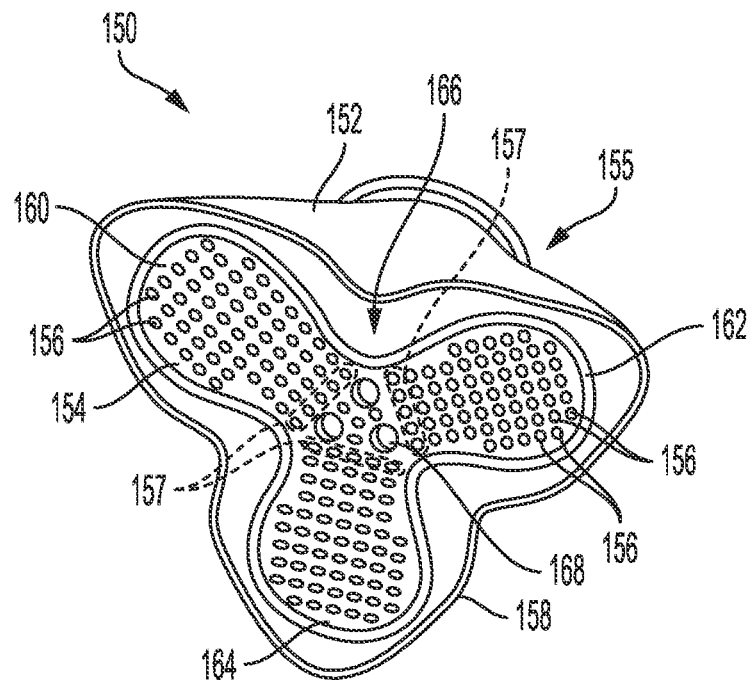
FIG. 18 shows an illustrative diagrammatic elevational isometric view of an end effector in accordance with a further aspect of the present invention that includes three finger portions and a shroud around the three finger portions.

FIG. 18 shows another three fingered end-effector that includes a shroud or skirt. The end-effector 150 includes a body 152 with a connection portion 155 for coupling to a mounting section 40 of an articulated arm 22 (shown in FIG. 1), and a contact section 154 for contacting an object to be grasped. The contact section 154 may generally include three extension sections 160, 162, 164 that join in a central region 166. While the three extension sections may include apertures 156 of a fixed smaller size, the central region 166 may include larger apertures 168 that are central to the three extension sections as shown. The body 152 of the end-effector 150 further includes a shroud 158 that encircles the extension sections of the contact portion and extends slightly below the contact portion, which facilitates maintaining vacuum contact with the object. The end-effector 150 also provides that the apertures 157 along a line of each extension section adjacent the central region 166 provide features that facilitate bending of each extension section with respect to the central region. As the apertures 156 are provided in rows along the extension sections, each later row may also provide additional features that facilitate bending of each extension section with respect to the central region.

Figure 19:
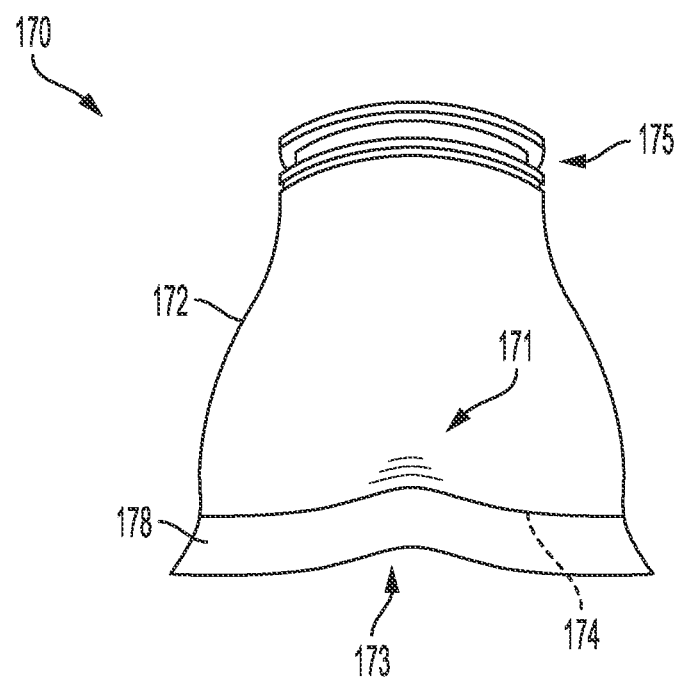
FIG. 19 shows an illustrative diagrammatic front view of an end effector in accordance with a further aspect of the present invention that includes three finger portions, where the body includes bending features to facilitate bending of the contact surface.
Figure 20:
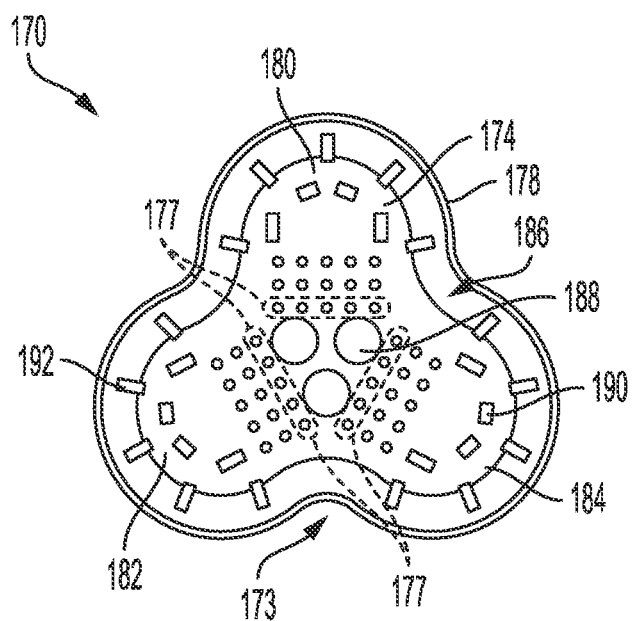
FIG. 20 shows an illustrative diagrammatic bottom view of the end effector of FIG. 19.

FIGS. 19 and 20 show a three fingered end-effector that includes a body with one or more bending features. The end-effector 170 includes a body 172 with a connection portion 175 for coupling to a mounting section 40 of an articulated arm 22 (shown in FIG. 1), and a contact section 174 for contacting an object to be grasped. The body 172 includes one or more (e.g., three) bending features 171 in the form of a pinched area of the surface of the body, as well as one or more (e.g., three) bending features 173 in a shroud 178, both of which may facilitate bending of the contact portion when grasping a non-rigid object. The contact section 174 may generally include three extension sections 180, 182, 184 that join in a central region 186. While the three extension sections may include apertures 177 of a fixed smaller size, the central region 186 may include larger apertures 188 that are central to the three extension sections as shown. The end-effector 170 further includes the shroud 178 that encircles the extension sections of the contact portion and extends slightly below the contact portion, which facilitates maintaining vacuum contact with the object.

The end-effector 170 also provides that the apertures 177 along a line of each extension section adjacent the central region 186 provide features that facilitate bending of each extension section with respect to the central region. As the apertures 177 are provided in rows along the extension sections, each later row may also provide additional features that facilitate bending of each extension section with respect to the central region. Further, the body 172 may include one or more (e.g., three) features 173 that pinch the outer portion of the body 172, which also draws a portion of the shroud as indicated at 178 proximally (toward the connection portion 175). These features 173, 177 further facilitate bending of a respective extension section with respect to the central region. The end-effector 170 may further include additional apertures 190 as well as braces 192 for securing the shroud 178 to the body 172.

Figure 21:
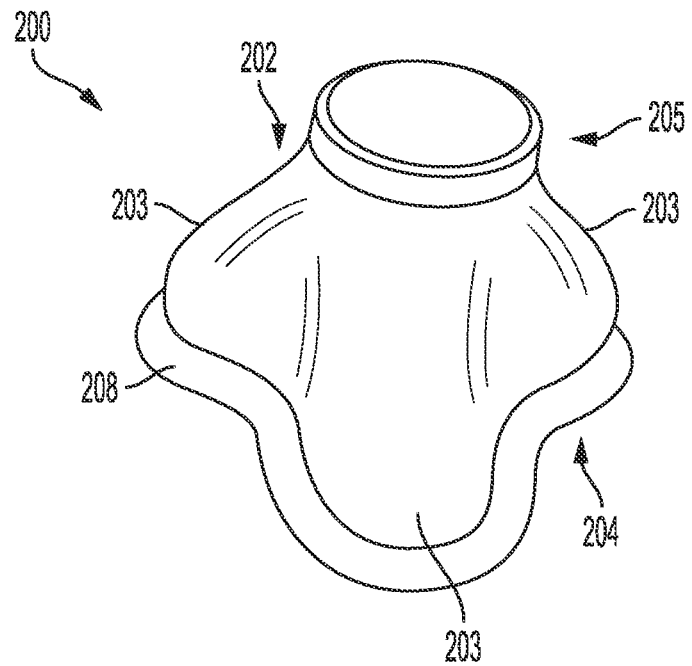
FIG. 21 shows an illustrative diagrammatic isometric view of an end effector in accordance with a further aspect of the present invention that includes three finger portions, where the body includes nodules to facilitate bending of the contact surface.
Figure 22:
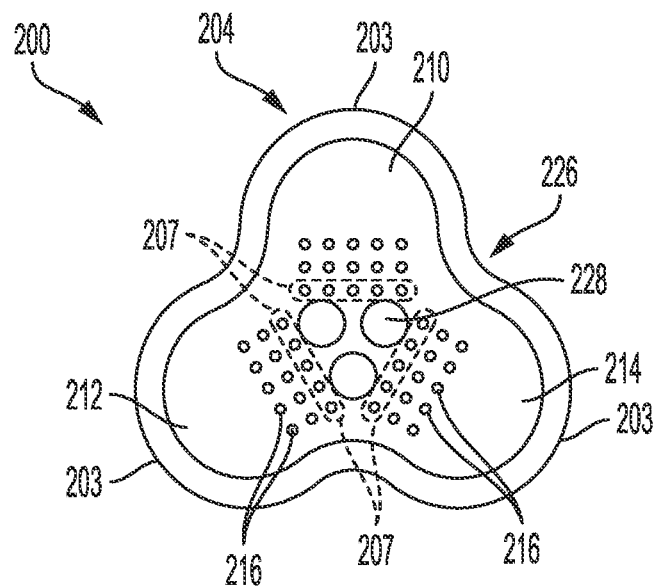
FIG. 22 shows an illustrative diagrammatic bottom view of the end effector of FIG. 21.

FIGS. 21 and 22 show another three fingered that includes a body with a plurality of nodules as bending features. The end-effector 200 includes a body 202 with a connection portion 205 for coupling to a mounting section 40 of an articulated arm 22 (shown in FIG. 1), and a contact section 204 for contacting an object to be grasped. The contact section 204 may generally include three extension sections 210, 212, 214 that join in a central region 226. While the three extension sections may include apertures 216 of a fixed smaller size, the central region 226 may include larger apertures 228 that are central to the three extension sections as shown. The body also includes three nodules 203 in registration with the extension sections 210, 212, 214, and the nodules 203 facilitate the contact portion becoming non-planar when grasping a non-rigid object. The end-effector 200 further includes a shroud 208 that encircles the extension sections of the contact portion and extends slightly below the contact portion, which facilitates maintaining vacuum contact with the object.

The end-effector 200 also provides that the apertures 207 along a line of each extension section adjacent the central region 226 provide features that facilitate bending of each extension section with respect to the central region. As the apertures 216 are provided in rows along the extension sections, each later row may also provide additional features that facilitate bending of each extension section with respect to the central region. Further, the body 202 may include one or more (e.g., three) indented features that define each nodule 203 that pinch the outer portion of the body 202, which causes an axial restriction of the features toward a central axis of a path of the vacuum. These features 203, 207 further facilitate bending of a respective extension section with respect to the central region. The end-effector 200 may further include additional apertures 228 proximal the central region 226 to facilitate a large amount of air to move along a central path when the end-effector is under vacuum.

Figure 23:
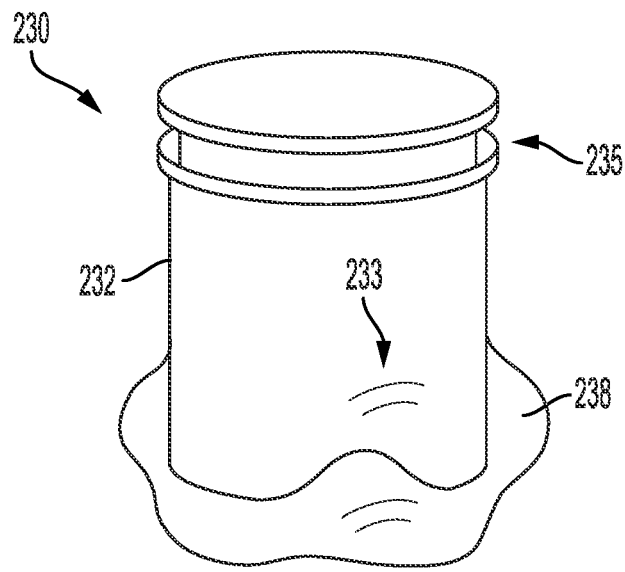
FIG. 23 shows an illustrative diagrammatic isometric view of an end effector in accordance with a further aspect of the present invention that includes three finger portions, where the body is generally cylindrical and includes pinched areas to facilitate bending of the contact surface.
Figure 24:
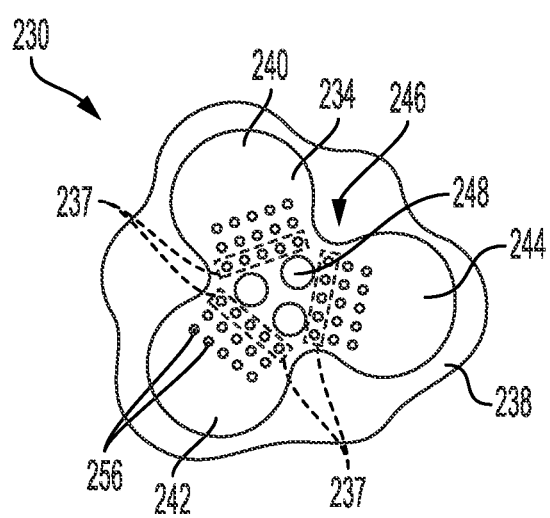
FIG. 24 shows an illustrative diagrammatic bottom view of the end effector of FIG. 23.

FIGS. 23 and 24 show another three fingered that includes a generally cylindrical body with a plurality of bending features in the form of pinched areas of the surface of the body. The end-effector 230 includes a body 232 with a connection portion 235 for coupling to a mounting section 40 of an articulated arm 22 (shown in FIG. 1), and a contact section 234 for contacting an object to be grasped. The contact section 234 may generally include three extension sections 240, 242, 244 that join in a central region 246. While the three extension sections may include apertures 256 of a fixed smaller size, the central region 246 may include larger apertures 248 that are central to the three extension sections as shown. The body also includes one or more (e.g., three) bending features 233 in the form of pinched areas of the surface of the body in registration with the extension sections 240, 242, 244, and the nodules 233 facilitate the contact portion becoming non-planar when grasping a non-rigid object. The end-effector 230 further includes a shroud 238 that encircles the extension sections of the contact portion and extends slightly below the contact portion, which facilitates maintaining vacuum contact with the object.

The end-effector 230 also provides that the apertures 237 along a line of each extension section adjacent the central region 246 provide features that facilitate bending of each extension section with respect to the central region. As the apertures 256 are provided in rows along the extension sections, each later row may also provide additional features that facilitate bending of each extension section with respect to the central region. Again, the body 232 may include one or more (e.g., three) pinched features 233, which causes an axial restriction of the features toward a central axis of a path of the vacuum. These features 233, 237 further facilitate bending of a respective extension section with respect to the central region. The end-effector 230 may further include larger diameter apertures 248 proximal the central region 246 to facilitate a large amount of air to move along a central path when the end-effector is under vacuum.

Figure 25:
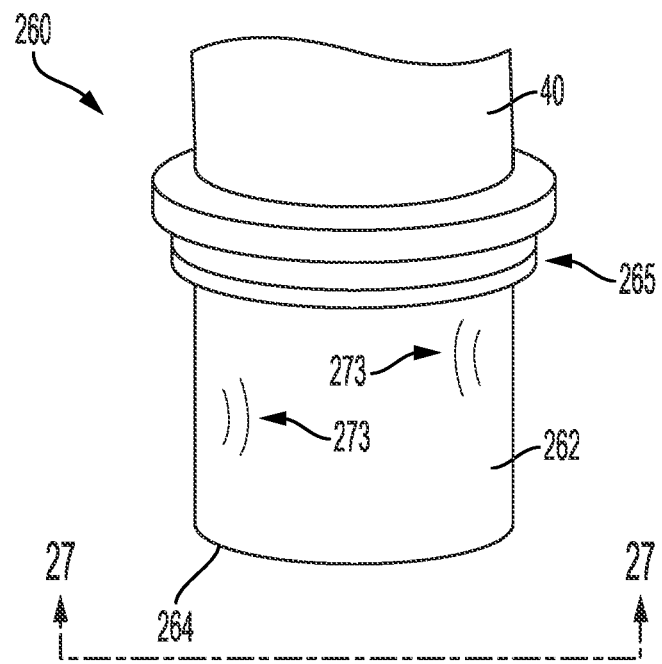
FIG. 25 shows an illustrative diagrammatic isometric view of an end effector in accordance with a further aspect of the present invention that includes two finger portions, where the body is generally cylindrical and includes indented features to facilitate bending of the contact surface.
Figure 26:
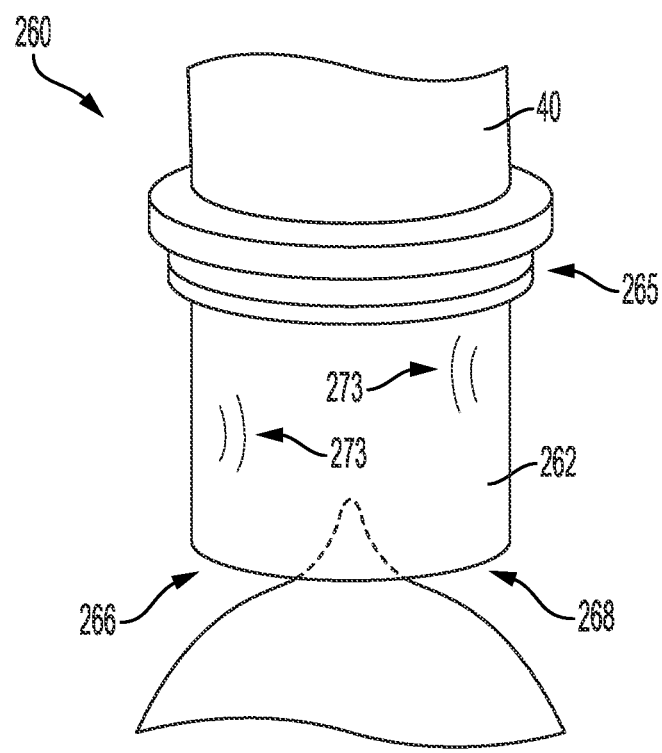
FIG. 26 shows an illustrative diagrammatic view of the end effector of Figure while grasping.
Figure 27:
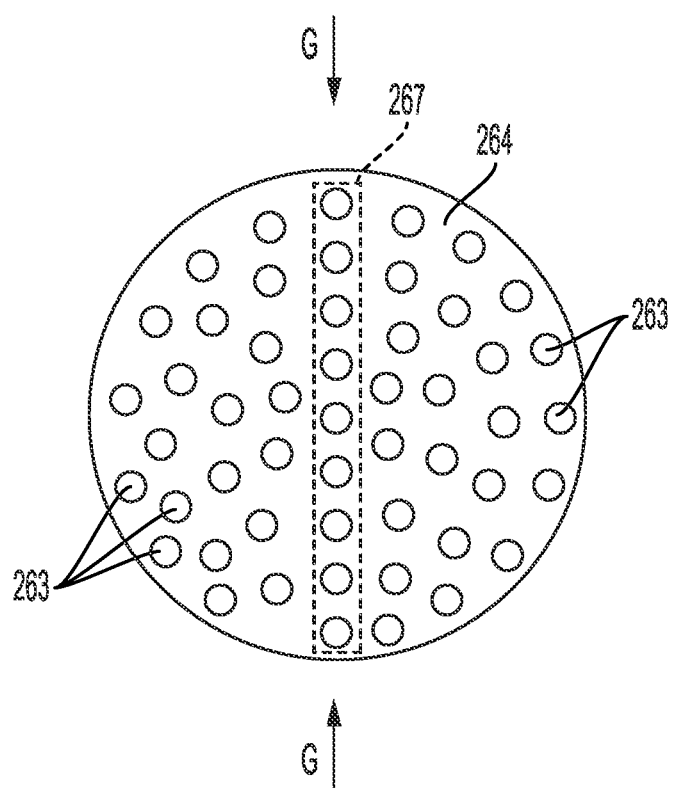
FIG. 27 shows an illustrative diagrammatic bottom view of the end effector of FIG. 25.

FIGS. 25-27 show a two fingered end-effector that includes a cylindrical body with walls that include depressions or thinned areas to provide bending features. The end-effector 260 includes a body 262 with a connection portion 265 for coupling to a mounting section 40 of an articulated arm 22 (shown in FIG. 1), and a contact section 264 for contacting an object to be grasped via vacuum through apertures 263 (shown in FIG. 27). The contact section 264 may generally include two extension sections 266, 268 (shown in FIG. 26). The end-effector 260 also provides that the apertures 267 along a line generally indicated at G-G in FIG. 27 provides a feature that facilitates bending of the contact section. Further, the body 262 may include one or more (e.g., two) indented features 273 that permit collapse of portions of the outer portion of the body 262, which causes an axial restriction of the features toward a central axis of a path of the vacuum. These features 267, 273 further facilitate bending of a respective extension section with respect to the central region. The end-effector 260 may therefore provide a more cylindrical shaped body that is adapted to change shape when the contact portion thereof is under a vacuum as applied to an object, to fold as discussed above to better grasp an object by the contact portion 264.

Each of the end effectors of FIGS. 15-27 permit the contact surface to become non-planar by bending as discussed above with reference to FIGS. 4-14, permitting the outer surface to grasp the object, at least in part, with friction to facilitate maintaining a hold a non-rigid object during movement.

Figure 28:
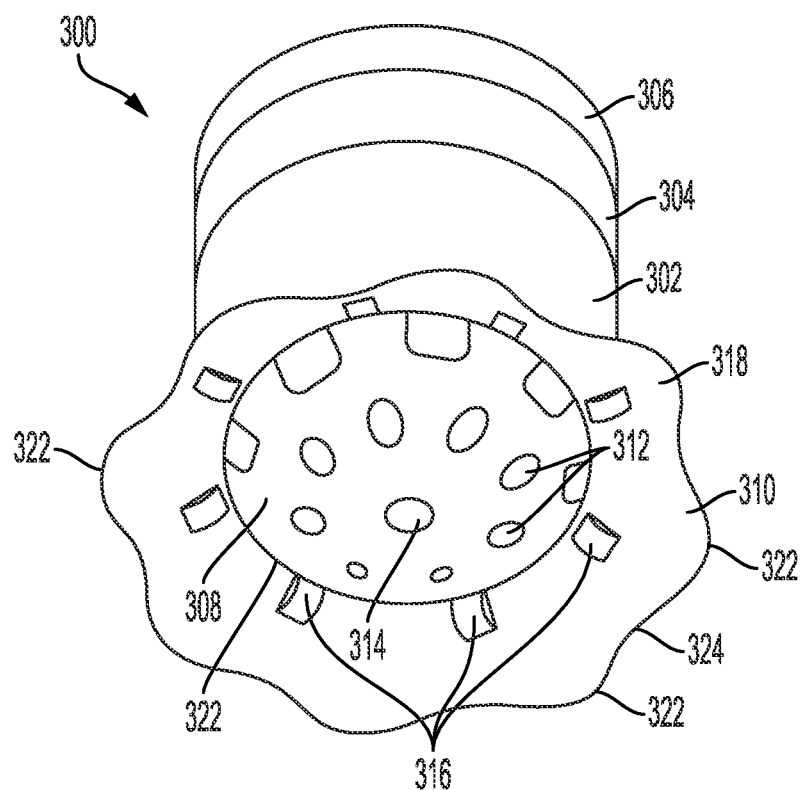
FIG. 28 shows an illustrative diagrammatic isometric view of an end effector in accordance with a further aspect of the present invention that includes a collapsible dome and a shroud.

With reference to FIG. 28, an end-effector 300 in accordance with another aspect of the invention includes a flexible body portion 302 attached to an end-effector base 304 that is coupled to a coupling 306 for mounting to a programmable motion device (such as programmable motion device of FIG. 1). The body 302 includes a collapsible dome 308 as well as a shroud 310. The collapsible dome 308 includes a plurality of apertures 312 as well as a central aperture 314. The flexible body 302 further includes a plurality of braces 316 mounted on an inner surface 318 of the shroud 310 proximate a generally circular base 322 of the collapsible dome 308.

Figure 29:
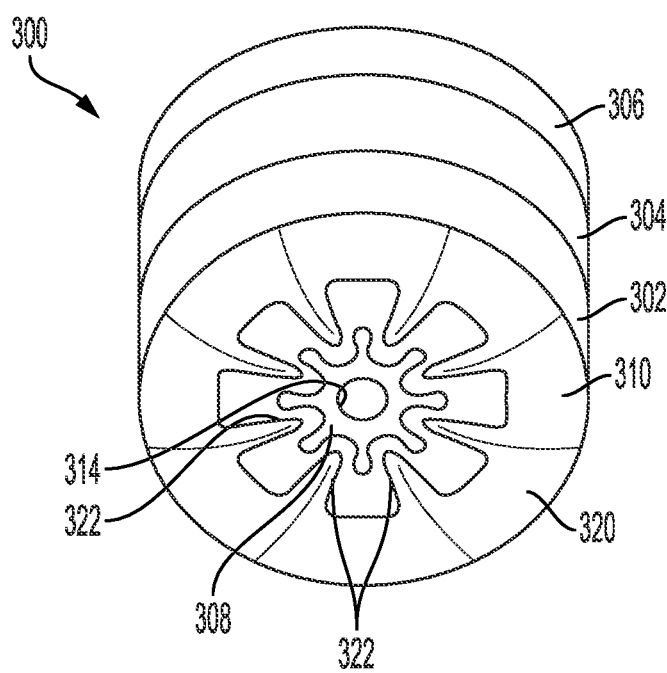
FIG. 29 shows an illustrative diagrammatic view of the end effector of FIG. 28 while grasping.
Figure 30:
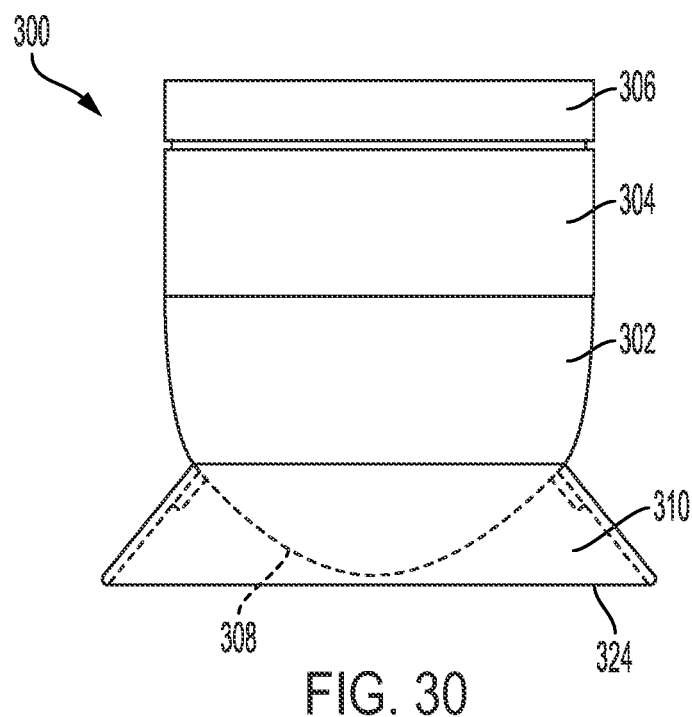
FIG. 30 shows an illustrative diagrammatic side view of the end effector of FIG. 28.
Figure 32:
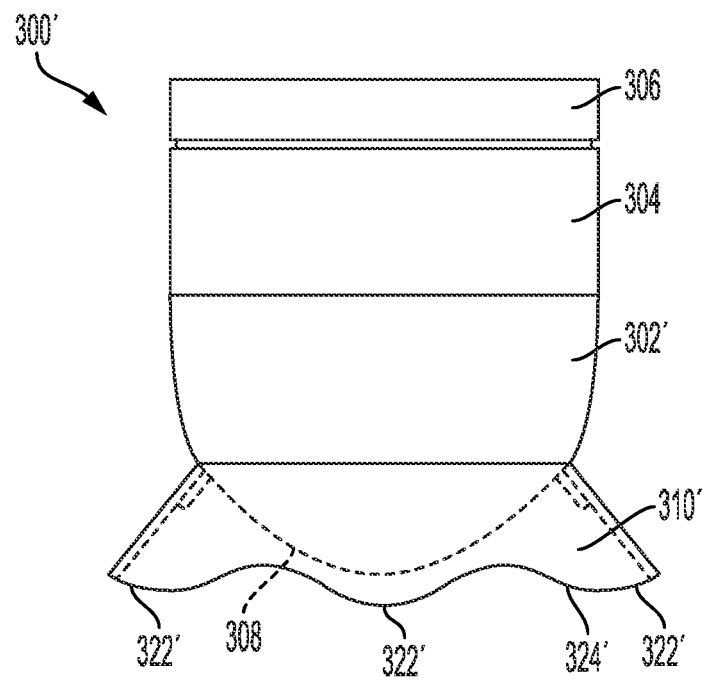
FIG. 32 shows an illustrative diagrammatic side view of an end effector in accordance with a further aspect of the present invention that includes a collapsible dome and a shroud with a scalloped edge.

The shroud 310 may be generally frustoconical in shape, and the outer edge 324 of the shroud 310 may include alternating extension regions 322 (e.g., may for example, be scalloped shaped). In accordance with an aspect, the outer edge 324 of the shroud 310 may be planar (e.g., flat) as shown in FIG. 30, or may be generally planar as shown in FIG. 32. With reference to FIG. 29, when a vacuum drawn through any of the plurality of openings 312, 314 in the collapsible dome 308, the contact surface of the flexible body (e.g., the collapsible dome 308 and optionally at least a portion the shroud 310) may become drawn into an open interior of the end-effector. FIG. 29 shows the collapsible dome 308 and portions of the shroud 310 drawn within the end-effector, showing the outside 320 of the shroud 310 with the alternating extension regions 322 drawn centrally to aid in grasping an object.

Figure 31:
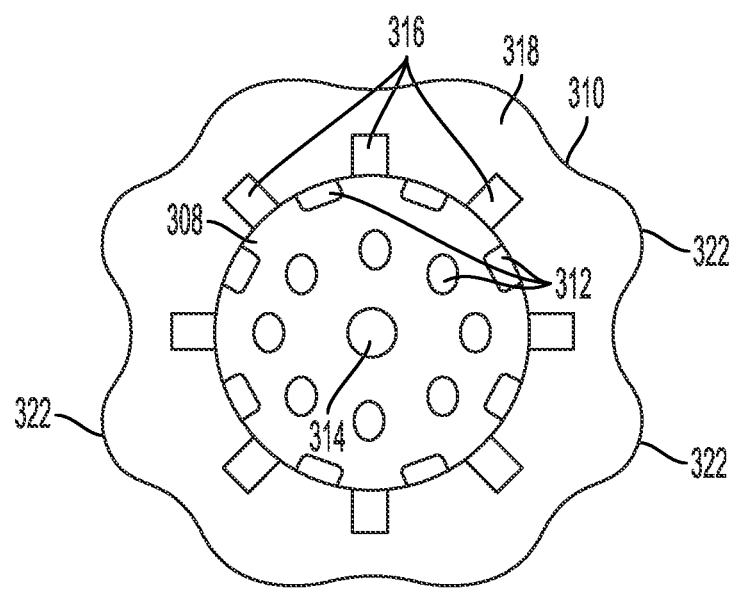
FIG. 31 shows an illustrative diagrammatic bottom view of the end effector of FIG. 28.

FIG. 30 shows a side view of the end-effector 300 of FIG. 28, showing the collapsible dome 308 in dashed lines within the shroud 310, and FIG. 31 shows the underside of the end-effector 300 showing the apertures 312, 314 as well as the braces 316 on the underside 318 of the shroud 310. FIG. 32 shows an end-effector 300' that includes an end-effector base 304 that is coupled to a coupling 306 for mounting to a programmable motion device, as well as a flexible body 302'. The flexible body 302' includes a shroud 310' that has an outer edge 324' that is not planar but that become planar when engaging a planar object (when the alternating extension regions 322' flatten on an object while engaging the object). Conversely, in the end-effector of FIGS. 28-31, the outer edge 324 of the shroud 310 forms a planar surface including the alternating extension regions 322. The areas between the alternating extension regions 322 may provide a plurality of features that permit flexing and/or bending to facilitate grasping an object.

Figure 33:
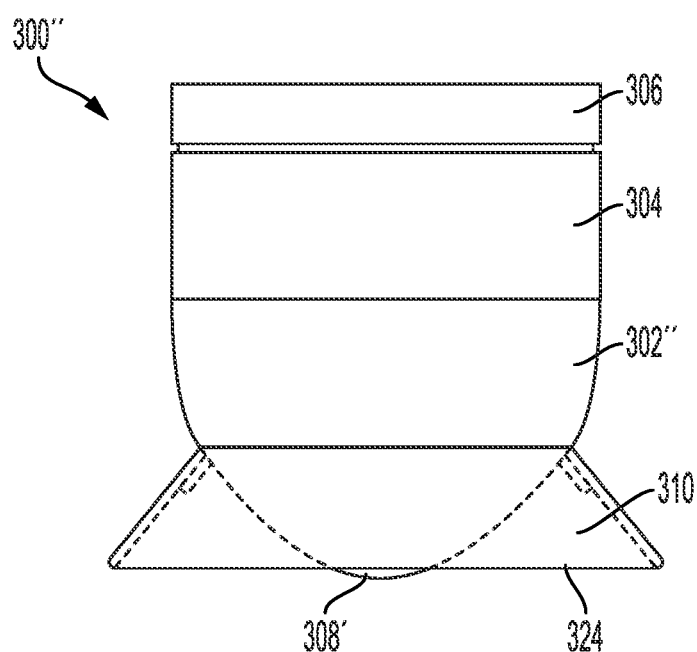
FIG. 33 shows an illustrative diagrammatic side view of an end effector in accordance with a further aspect of the present invention that includes a shroud and a collapsible dome that extends beyond the shroud prior to grasping.

FIG. 33 shows an end-effector 300" that includes an end-effector base 304 that is coupled to a coupling 306 for mounting to a programmable motion device, as well as a flexible body 302" that includes a collapsible dome 308' that extends beyond the outer edge 324 of the shroud 310. In each of the end-effectors of FIGS. 28-33 the collapsible dome may form part of the contact surface of the flexible body, and in the end-effector of FIG. 33, the collapsible dome may provide the contact surface that initially contacts an object.

Figure 34:
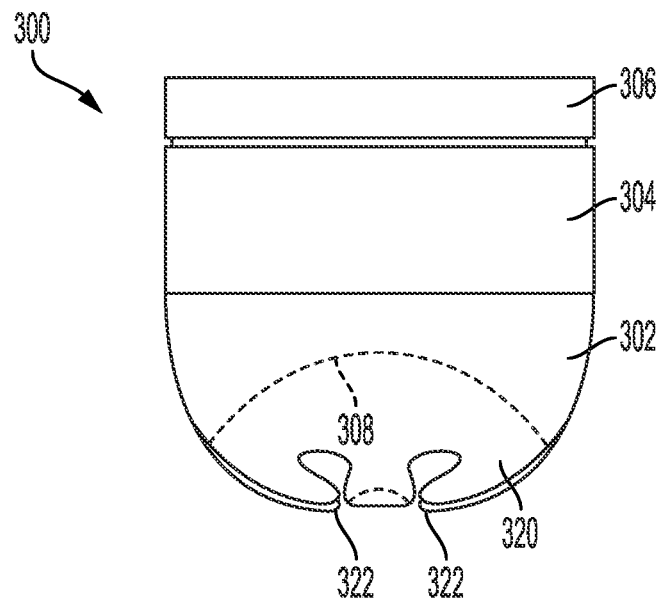
FIG. 34 shows an illustrative diagrammatic side view of the end effector of FIG. 28 while grasping.
Figure 35:
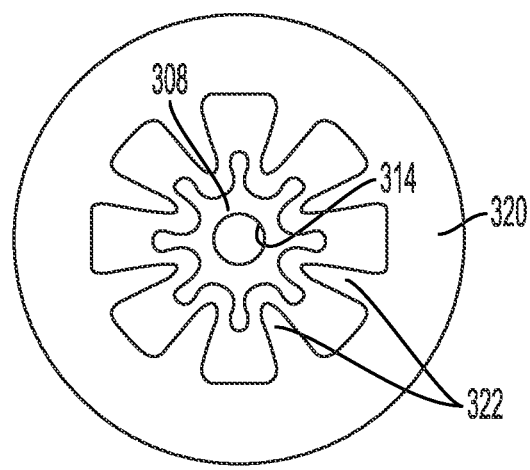
FIG. 35 shows an illustrative diagrammatic bottom view of the end effector of FIG. 34.
Figure 36:
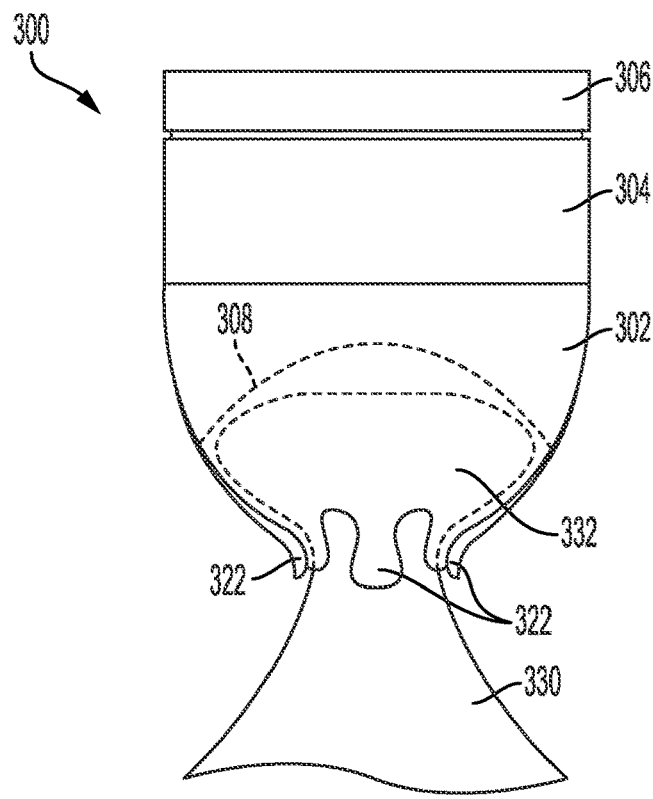
FIG. 36 shows an illustrative diagrammatic side view of the end effector of FIG. 28 while grasping a deformable object.

FIGS. 34 and 35 shows the flexible body 302 with the collapsible dome 308 in the collapsed position, with the alternating extension regions 322 centrally directed to engage an object. Again, the flexible body changes to the position of FIG. 34 (side view) and FIG. 35) bottom view when a vacuum through the flexible body 302 is occluded by an object. FIG. 36 shows the end-effector 300 having engaged an object 330 (e.g., an object having low pose authority such as a plastic bag that contains items). A portion 332 of the bag 330 is drawn into the flexible body 302 together with collapsible dome 308. The shroud 310 is drawn in centrally, and the inner surface of the shroud 310 acts to contain at least a portion of the object 330. Additionally, the inner surface of the shroud 310 provides a surface along which the portion 332 of the object 330 must slide if the object were to slip out of the end-effector. This engagement with the object that additionally retains the object through shear forces provided by the angled contact portion in resisting any sliding downward of the bag with respect to the contact portion.

Figure 37:
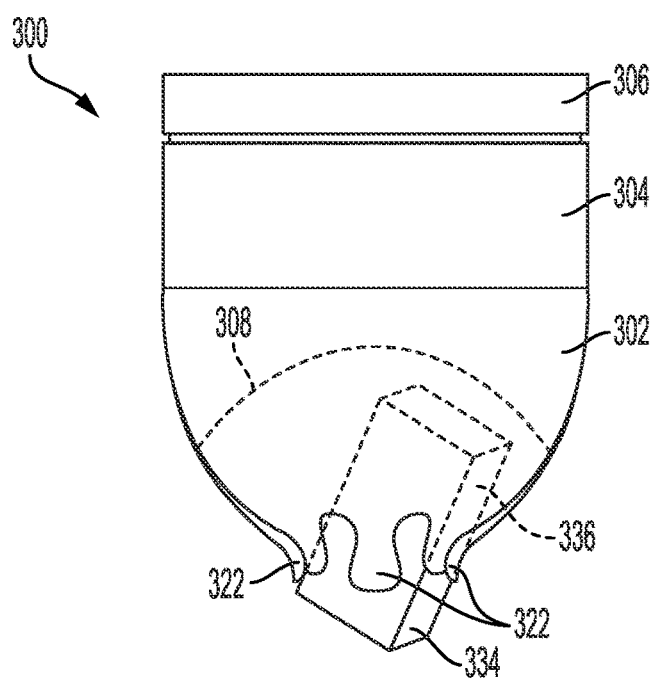
FIG. 37 shows an illustrative diagrammatic side view of the end effector of FIG. 28 while grasping a rigid object.

Similarly, FIG. 37 shows the end-effector 300 having engaged an object 334 (e.g., an object having high pose authority such as a rectangular box). A portion 336 of the box 334 is drawn into the flexible body 302 together with collapsible dome 308. The shroud 310 is drawn in centrally, and the inner surface of the shroud 310 acts to contain at least a portion of the object 334. Additionally, the inner surface of the shroud 310 provides a surface along which the portion 336 of the object 334 must slide if the object were to slip out of the end-effector. Again, this engagement with the object that additionally retains the object through shear forces provided by the angled contact portion in resisting any sliding downward of the bag with respect to the contact portion. The object (330, 334) may be released by any of removing the vacuum or providing positive air pressure.

Figure 38:
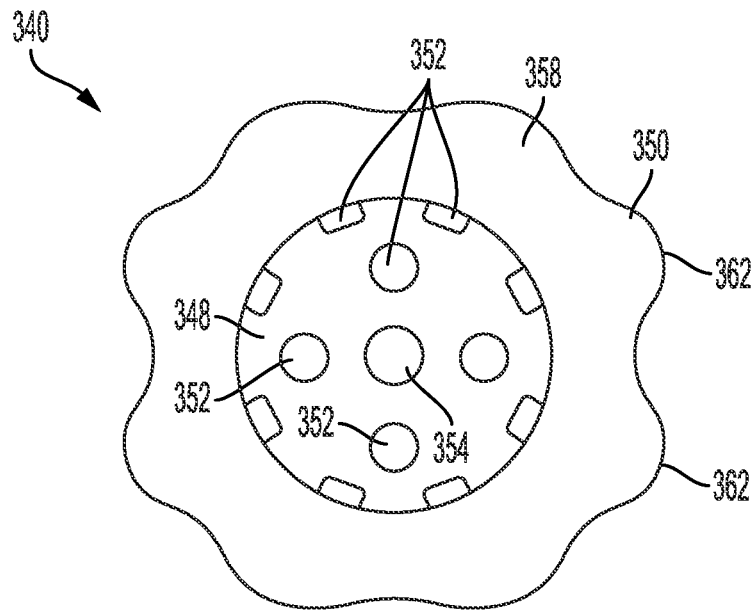
FIG. 38 shows an illustrative diagrammatic side view of an end effector in accordance with a further aspect of the present invention that includes a collapsible dome with fewer apertures, a shroud, and extension regions.
Figure 39:
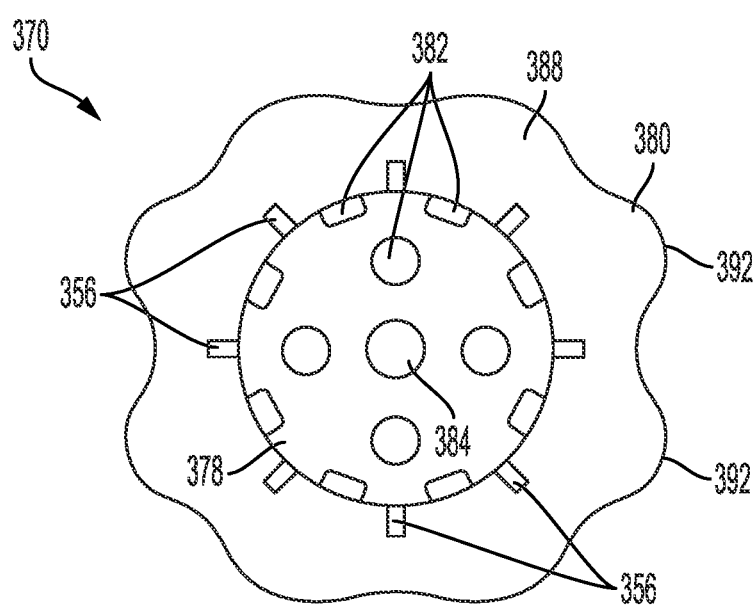
FIG. 39 shows an illustrative diagrammatic side view of an end effector in accordance with a further aspect of the present invention that includes a collapsible dome with fewer apertures, a shroud, extension regions, and additional braces.

With reference to FIG. 38 and in accordance with further aspects of the invention, an end-effector 340 may include a collapsible dome 348 having fewer apertures 352, 354 (the central aperture) and a shroud 350 with inner 358 and outer surfaces as well as extension regions 362 as discussed above. With reference to FIG. 39 and in accordance with further aspects of the invention, an end-effector 370 may include a collapsible dome 378 having fewer apertures 382, 384 (the central aperture) and a shroud 380. The shroud 380 may include inner 388 and outer surfaces as well as extension regions 392 as discussed above, with additional braces 356 that are smaller than the braces of the end-effector of FIGS. 30 and 37. In accordance with various aspects, the braces (316, 356) may facilitate the providing of vacuum force to more of the outer surfaces of the object when being held.

Figure 40:
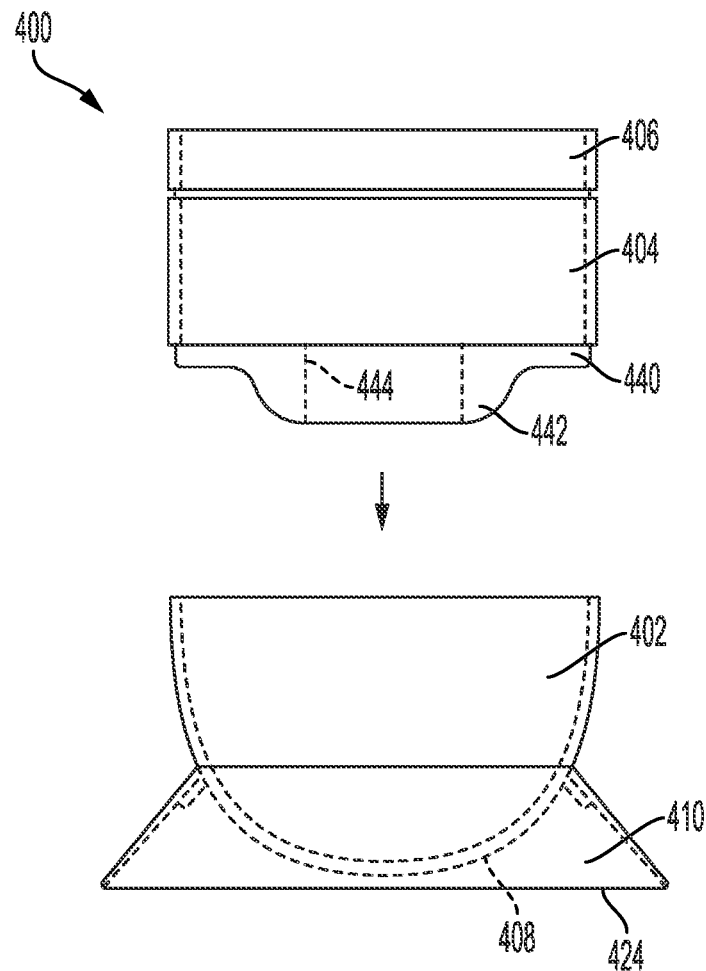
FIG. 40 shows an illustrative diagrammatic side view of an end effector in accordance with a further aspect of the present invention that includes a coupling attached to a flexible body.
Figure 41:
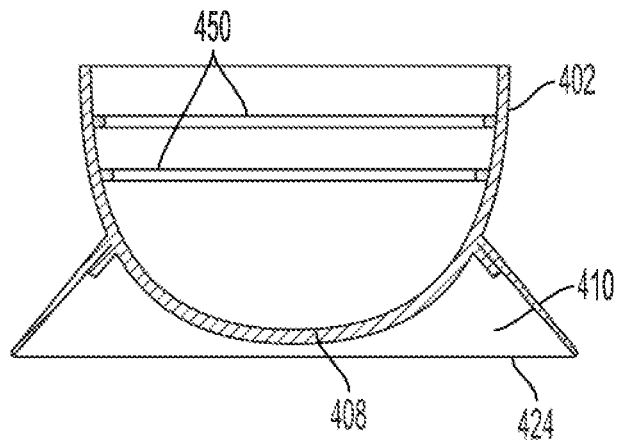
FIG. 41 shows an illustrative diagrammatic sectional side view of flexible body of FIG. 40 with inner circumferential support ribs.
Figure 42:
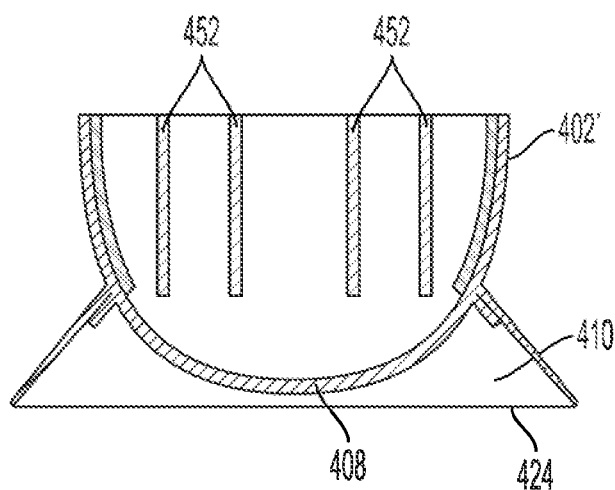
FIG. 42 shows an illustrative diagrammatic sectional side view of flexible body of FIG. 40 with axially extending support ribs.

In accordance with further aspects and with reference to FIG. 40, an end-effector 400 may include an end-effector base 404 that is coupled to a coupling 406 for mounting to a programmable motion device, as well as a flexible body 402. The flexible body 402 includes a shroud 410 with an outer edge 424, and with reference to FIG. 41, the inner surface of the flexible body may include one or more inner circumferentially directed support ribs 450 that provide rigidity to inhibit excessive collapse of the flexible body 402. With reference to FIG. 42, the inner surface of the flexible body 402' may include one or more axially directed support ribs 452 that provide rigidity to inhibit excessive collapse of the flexible body 402'.

Figure 43:
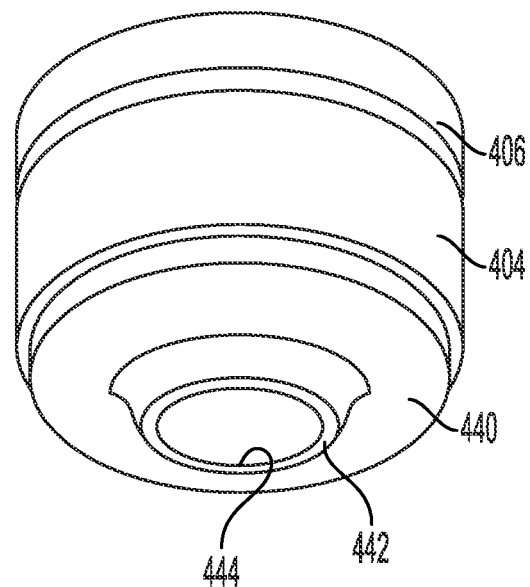
FIG. 43 shows an illustrative diagrammatic elevational isometric view of flexible body of FIG. 40 with a stop member.
Figure 44:
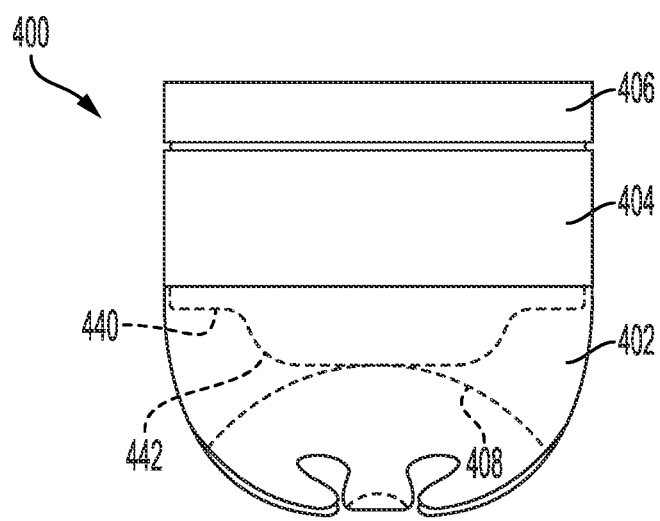
FIG. 44 shows an illustrative diagrammatic side view of flexible body and stop member of FIG. 43.

The end-effector base 404 of the end-effector 400 of FIG. 40 may further include a stop member 440 for limiting movement of the collapsible dome into the end-effector as further shown in FIG. 43. The stop member 440 may include a raised portion 442 that includes one or more apertures 444 therein to permit the flow of air at other than atmospheric therethrough (e.g., vacuum). With further reference to FIG. 44, the raised portion 442 limits the movement of the collapsible dome 408 into the end-effector, while permitting substantial flow of air at other than atmospheric pressure (e.g., vacuum) therethrough.

In accordance with various aspects of the present invention as discussed above with reference to FIGS. 4-44, when an object is grasped by the end-effector, the body is permitted to change its shape dependent on the object being grasped. The gripper folds due to the shape of the gripper body and any features. The shape and thickness of its walls, and the evacuation of the open interior cavity causes the gripper's fingers to fold inward when the suction cups' ports are sealed. The mechanical actuation that causes the gripper to fold is passive, and is achieved by the vacuum only. There are no motors, gears or other mechanisms employed that cause the fingers to fold, yet the passive mechanical actuation provides a multi-fingered hand when it needs to do so, and provides a suction cup when it needs to do so. The contact portion includes apertures that provide a vacuum to the outside surface of the contact portion through the open interior of the body. Generally, the vacuum is provided from the apertures through the opening in the connection portion and the mounting section through a hose to a vacuum source as discussed above. Each of the end effectors disclosed herein may be used with the programmable motion device of FIG. 1 in the object processing system of FIG. 1 for grasping and moving objects.

In accordance with certain aspects, the vacuum source may be switchable to change to a source of positive air pressure that is pushed from the source to the apertures to urge both an object away from the contact surface and to push the contact surface distally. In accordance with further aspects, in addition to being formed of flexible material, the body may be formed of a material and shape that provides a desired spring constant. The desired spring constant may provide that the body is biased to the original shape such that when deformed (as discussed herein), the body will act against any deformation, at least partially assisting in causing the body to return to its original shape.

In accordance with various aspects therefore, the invention provides articulation that allows folding of the gripping surface. This causes initial overall grip to transition from gripping-in-tension to gripping-in-shear. This folding is achieved via a hinge in the gripping surface, either a living hinge (via a flexible material) or mechanical hinge (with bearing surfaces). Articulation that causes the advantageous folding of the gripper such that the gripping surfaces of adjacent lobes end up facing each other, thus collecting the gripped material between them. Articulation that can produce a relatively sharp crease or fold in the gripping surface is also provided in accordance with various aspects, and/or folds of various radii. This allows for pinching of the gripped material, further enhancing overall grasping performance. Two or more flexible lobes may also be provided that help keep gripping surfaces in shear. The gripping surfaces may be made of, or coated with, high friction material in accordance with certain aspects. The lobes may be capable of jamming and continued vacuum through a permeable and flexible fluidized bed, and may provide an ability to stay in unfolded state to grip flat rigid surfaces. In accordance with further aspects, the end-effector may include an shroud, or conformable elastic skirt, on the perimeter of the gripping surface, to arrest air flow in either unfolded or folded states, or folded positions in between. In accordance with further aspects, the end-effector may provide an articulating central air pass through that actuates upwards when flow is arrested—drawing the lobes closed.

Those skilled in the art will appreciate that numerous modifications and variations may be made to the above disclosed embodiments without departing from the spirit and scope of the present invention.

What is claimed is:

1. An end-effector for a programmable motion device, the end-effector comprising a body that includes a contact portion, said body providing an open interior through which a vacuum is provided to the contact portion, the contact portion having a plurality of apertures defined therein through which the vacuum is provided to engage an object, and including at least one feature that is adapted to facilitate the contact portion to become substantially non-planar while grasping the object, wherein the at least one feature comprises one or more hinge portions, each hinge portion comprising a series of apertures provided in a line that defines a bend path in the contact portion.

2. The end-effector as claimed in claim 1, wherein the one or more hinge portions includes at least three hinge portions.

3. The end-effector as claimed in claim 1, wherein the body includes a plurality of nodules.

4. The end-effector as claimed in claim 1, wherein the body includes a compliant material.

5. The end-effector as claimed in claim 1, wherein the plurality of apertures defined in the contact portion provides a larger area of opening at a central region thereof than an area of opening at the periphery thereof.

6. The end-effector as claimed in claim 1, wherein the plurality of apertures defined in the contact portion includes larger diameter apertures at a central region of the contact portion as compared to diameters of apertures at the periphery of the contact portion.

7. The end-effector as claimed in claim 1, wherein the periphery of the contact portion is generally triangular in shape.

8. A programmable motion device including the end-effector of claim 1.

9. An object processing system including the programmable motion device of claim 8.

10. An end-effector for a programmable motion device, said end effector comprising a body that includes a contact portion, said body providing an open interior through which a vacuum may be provided to the contact portion, and said body including at least one feature that is adapted to facilitate the contact portion to bend along at least one bend path while grasping, wherein the contact portion defines a plurality of apertures therein, and wherein a central region of the contact portion has larger diameter apertures as compared to apertures at the periphery of the contact portion.

11. The end-effector as claimed in claim 10, wherein the at least one feature is provided as a hinge-portion of the contact portion.

12. The end-effector as claimed in claim 11, wherein the hinge portion includes a concavity in the contact portion that facilitates bending.

13. The end-effector as claimed in claim 12, wherein the concavity is formed in an inner surface of the contact portion that faces the open interior.

14. The end-effector as claimed in claim 10, wherein the at least one feature is provided as at least two hinge portions.

15. The end-effector as claimed in claim 10, wherein the at least one feature is provided as at least three hinge portions.

16. The end-effector as claimed in claim 10, wherein the at least one feature is provided as a series of apertures in the contact portion.

17. The end-effector as claimed in claim 16, wherein the series of apertures are provided in a line that defines a bending portion of the contact portion.

18. The end-effector as claimed in claim 10, wherein the at least one feature is provided as a nodule.

19. The end-effector as claimed in claim 18, wherein the body includes a plurality of nodules.

20. The end-effector as claimed in claim 10, wherein the body includes a compliant material.

21. The end-effector as claimed in claim 10, wherein the plurality of apertures defined in the contact portion provides a larger area of opening at the central region of the contact portion than an area of opening at the periphery thereof.

22. A programmable motion device including the end-effector of claim 10.

23. An object processing system including the programmable motion device of claim 22.

24. A method of grasping an object with an end-effector that includes a body that provides an open interior that is coupled to a vacuum, said method comprising:
   contacting a contact portion of the body with the object, the contact portion having a plurality of apertures defined therein;
   applying a vacuum through the plurality of apertures in the contact portion to the object to primarily engage the object through tension force between the contact portion and the object; and
   permitting the contact portion of the body to bend along at least one bend path while grasping the object such that the object becomes primarily engaged with the object via a shear force that is greater than the tension force between the contact portion and the object,
   wherein the at least one bend path is defined by at least one hinge portion that comprises a series of apertures in the contact portion.

25. The method as claimed in claim 24, wherein the at least one hinge portion includes at least three hinge portions.

26. The method as claimed in claim 24, wherein the plurality of apertures defined in the contact portion provides a larger area of opening at a central region of the contact portion than an area of opening at the periphery thereof.

27. The method as claimed in claim 24, wherein the plurality of apertures defined in the contact portion includes larger diameter openings at a central region of the contact portion as compared to diameters of apertures at the periphery of the contact portion.

28. The method as claimed in claim 24, wherein the periphery of the contact portion is generally triangular in shape.

29. A method of grasping an object with an end-effector that includes a body that provides an open interior that is coupled to a vacuum, said method comprising:
   contacting a contact portion of the body with the object, the contact portion having a plurality of apertures defined therein;
   applying a vacuum through the plurality of apertures in the contact portion to the object to primarily engage the object through tension force between the contact portion and the object; and
   permitting the contact portion of the body to bend along at least one feature that defines a bend path in the contact portion while grasping the object such that the object becomes primarily engaged with the object via a shear force that is greater than the tension force between the contact portion and the object,
   wherein a central region of the contact portion has larger diameter apertures as compared to apertures at the periphery of the contact portion.

30. The method as claimed in claim 29, wherein the at least one feature is provided as a hinge-portion of the contact portion.

31. The method as claimed in claim 30, wherein the hinge portion includes a concavity in the contact portion that facilitates bending.

32. The method as claimed in claim 31, wherein the concavity is formed in an inner surface of the contact portion that faces the open interior.

33. The method as claimed in claim 29, wherein the at least one feature is provided as at least two hinge portions.

34. The method as claimed in claim 29, wherein the at least one feature is provided as at least three hinge portions.

35. The method as claimed in claim 29, wherein the bend path is provided as a series of apertures in the contact portion.

36. The method as claimed in claim 29, wherein the plurality of apertures defined in the contact portion provides a larger area of opening at a central region of the contact portion than an area of opening at the periphery of the contact portion.

37. The method as claimed in claim 29, wherein the periphery of the contact portion is generally triangular in shape.

* * * * *